United States Patent
Davis (12)

(10) Patent No.: US 8,280,768 B2
(45) Date of Patent: Oct. 2, 2012

(54) METHOD FOR POINT OF SALE CONSUMER PACKAGED GOODS AND LOTTERY PROMOTIONS

(76) Inventor: David L. Davis, South Euclid, OH (US)

(*) Notice: Subject to any disclaimer, the term of this patent is extended or adjusted under 35 U.S.C. 154(b) by 662 days.

(21) Appl. No.: 12/356,709

(22) Filed: Jan. 21, 2009

(65) Prior Publication Data

US 2009/0292600 A1    Nov. 26, 2009

Related U.S. Application Data

(60) Provisional application No. 61/022,451, filed on Jan. 21, 2008.

(51) Int. Cl.
- G06Q 30/00 (2012.01)
- G06Q 20/00 (2012.01)
- G07G 1/14 (2006.01)
- A63F 13/00 (2006.01)

(52) U.S. Cl. .............. 705/14.14; 705/14.13; 705/14.28; 705/14.32; 705/14.35; 463/17

(58) Field of Classification Search .............. 705/14, 705/14.35, 14.13, 14.28, 14.32; 463/17
See application file for complete search history.

(56) References Cited

U.S. PATENT DOCUMENTS

| | | | | |
|---|---|---|---|---|
| 7,240,021 | B1* | 7/2007 | Walker et al. | 705/14.35 |
| 2004/0103023 | A1* | 5/2004 | Irwin et al. | 705/14 |
| 2004/0176158 | A1* | 9/2004 | Baldwin | 463/17 |
| 2006/0119033 | A1 | 6/2006 | Davis | |

* cited by examiner

Primary Examiner — John Weiss
Assistant Examiner — Marilyn G Macasiano

(57) ABSTRACT

A method and system for point of sale consumer packaged goods and lottery promotions. A discount coupon is generated having two barcodes. The first barcode encodes standard UPC barcode data including, e.g., manufacturer ID, retail product or a retail product family, and discount value code. The second barcode encodes a FreePlay identifier code. A POS system scans the barcodes and the FreePlay identifier code is recognized. Based on this, the consumer is offered a choice of a Lottery FreePlay coupon in lieu of the discount on the retail product. When the consumer accepts the choice of a Lottery FreePlay coupon, a Lottery FreePlay coupon is printed for the consumer in lieu of giving the consumer a discount on the retail product. The Lottery FreePlay coupon is redeemable at an authorized lottery booth for a lottery ticket having a purchase price based on the discount value code.

16 Claims, 18 Drawing Sheets

"Food Stretcher" Electronic Food Stamps/WIC Promo
You must be the 75th Electronic Food Stamp or WIC Card User,
buying all items below in this bundle to qualify,
receive $10 OFF your next visit to this store with
any purchase of $ 10 or more
Exp. 10/31/07

LIMIT ONE COUPON PER FAMILY
Not valid with other offers. Offer does not apply to prior sales.

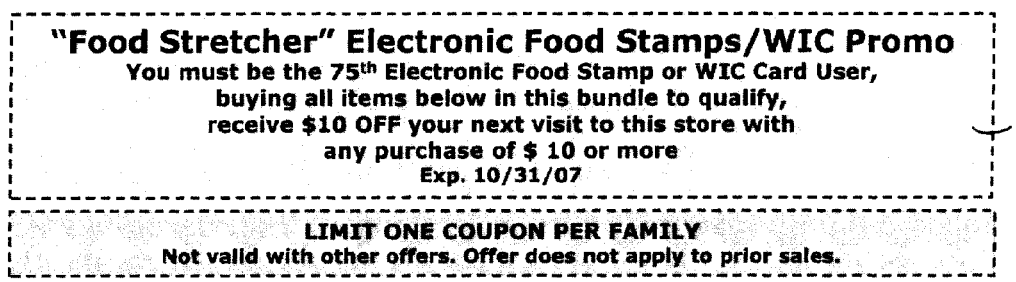

"Food Stretcher" Promotions Bundle 001 Item # 1
Save  On any ONE box of Quaker® Sweet & Salty "Food Stretcher"
Electronic Food Stamps/WIC Promo

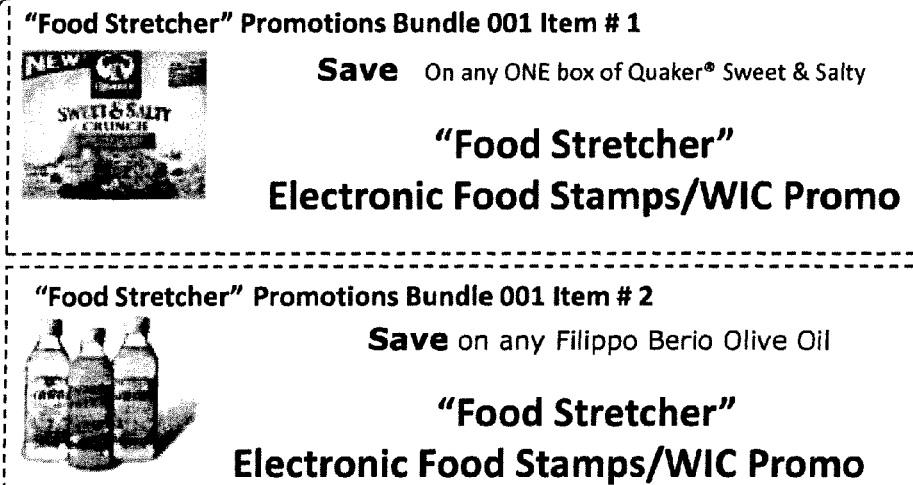

"Food Stretcher" Promotions Bundle 001 Item # 2
Save on any Filippo Berio Olive Oil "Food Stretcher"
Electronic Food Stamps/WIC Promo "Food Stretcher" Electronic Food Stamps/WIC Promo
Receive $10 OFF your next store visit with any purchase of $ 10 or more. Exp. 10/31/07

LIMIT ONE COUPON PER FAMILY
Not valid with other offers. Offer does not apply to prior sales.

|||||||| FPO ||||||     |||||||||||||| FPO |||||||||||||
5 99999 001 61 2     (21) ALPHANUMERIC Serial Number

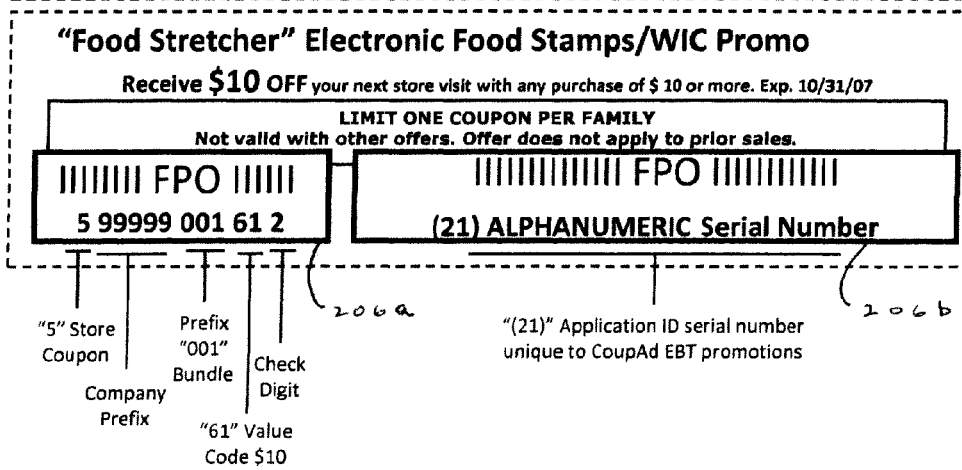

"5" Store Coupon | Prefix "001" Bundle | Check Digit
Company Prefix | "61" Value Code $10

"(21)" Application ID serial number unique to CoupAd EBT promotions

FIG. 12

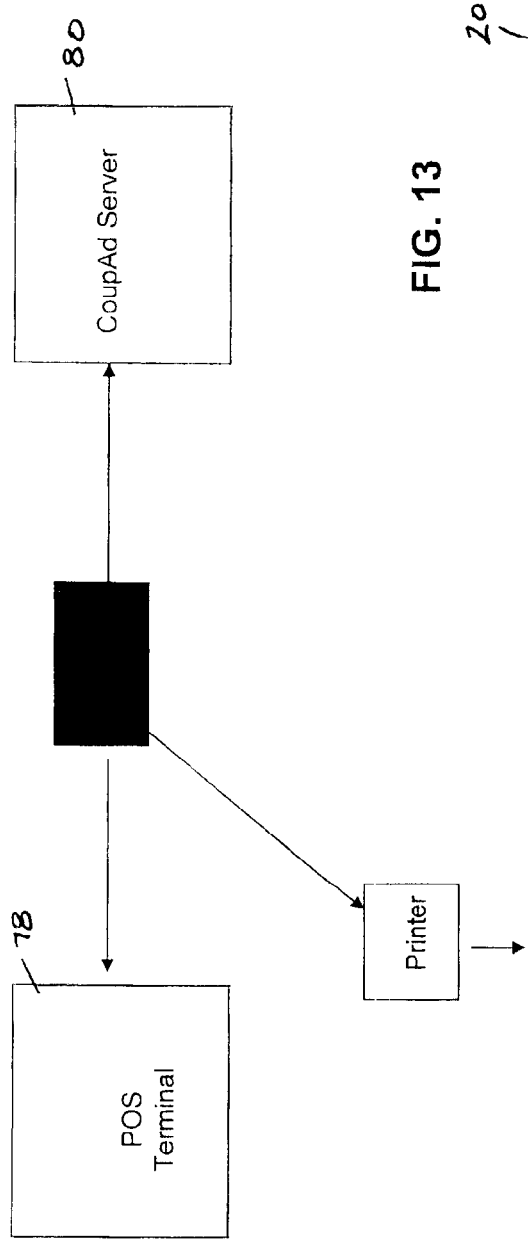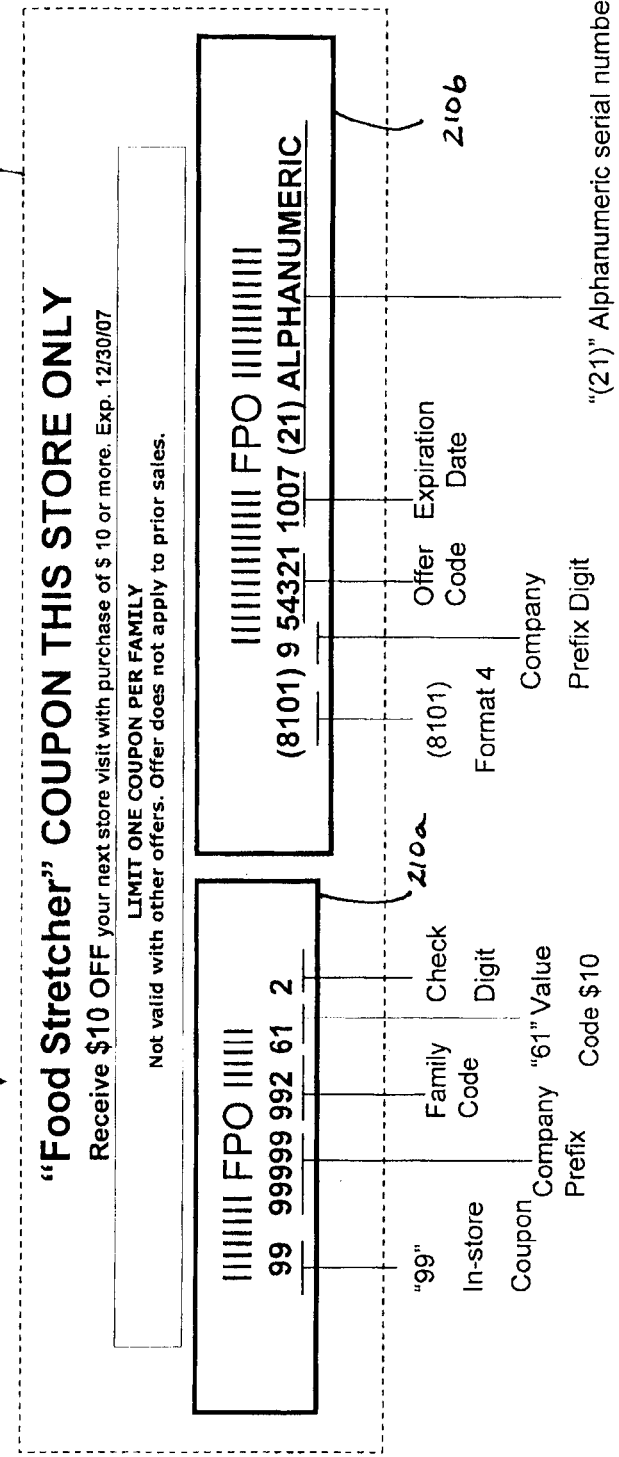
FIG. 13

METHOD FOR POINT OF SALE CONSUMER PACKAGED GOODS AND LOTTERY PROMOTIONS

The present application claims priority from U.S. Provisional Patent Application Ser. No. 61/022,451 filed Jan. 21, 2008, which is incorporated herein by reference in its entirety.

BACKGROUND

The present exemplary embodiment relates to consumer packaged goods promotions. It finds particular application in conjunction with discount coupons, and will be described with particular reference thereto. However, it is to be appreciated that the present exemplary embodiment is also amenable to other like applications.

Manufacturers and distributors of packaged goods offer coupons as one means of promoting their retail goods to consumers. These coupons are currently distributed to consumers by means known in the art such as, e.g., direct mailings. However, these methods do not necessarily deliver the coupons to the groups or individuals most likely to purchase the products, resulting in unnecessary expense and waste. Manufacturers therefore are seeking methods and means of targeting their coupon distribution to individuals who are in a demographic group most likely to purchase the product. Demographic studies can be of assistance in this regard. For example, a study of lottery ticket purchasers can reveal products or types of products that lottery ticket purchasers are likely to buy. The question then becomes, how to distribute coupons for the identified product types to those who purchase lottery tickets.

The present application describes a method and system for distributing coupons that enables manufacturers to distribute coupons to a targeted group, e.g., the aforementioned lottery ticket purchasers. The present application also advantageously discloses a method that is beneficial to lottery commissions and provides a means of making lottery playing and lottery tickets more desirable and economically feasible to purchase, thereby even further enhancing the efficacy of the methods disclosed herein.

BRIEF DESCRIPTION

A method for point of sale consumer packaged goods and lottery promotions, is provided. A discount coupon is generated having two barcodes. The first barcode encodes standard UPC barcode data including, e.g., manufacturer ID, retail product or a retail product family, and discount value code. The second barcode encodes a FreePlay identifier code. A POS system scans the barcodes when presented for redemption by a consumer, and the FreePlay identifier code is recognized by the POS system. Based on this, the consumer is offered a choice of a Lottery FreePlay coupon in lieu of the discount on the retail product. When the consumer accepts the choice of a Lottery FreePlay coupon, a Lottery FreePlay coupon is printed for the consumer in lieu of giving the consumer a discount on the retail product. The Lottery FreePlay coupon can be printed on the register receipt, which typically includes the items purchased by the consumer and the price of each item, or a separately printed coupon, e.g. a piece of paper separate from the register receipt can be provided to the consumer. The Lottery FreePlay coupon is redeemable at an authorized lottery booth for a lottery ticket having a purchase price based on the discount value code.

A system is also provided for point of sale ("POS") consumer packaged goods and lottery promotions. The POS system includes a POS user interface, a POS scanner for scanning retail product barcodes, and a POS processor for controlling operation of the POS system, the POS user interface, and the POS scanner. The POS system also includes a POS hardware interface having a POS processor connection point, a POS scanner connection point, and a POS user interface connection point. A CoupAd server is operatively connected to the POS system by means of the POS hardware interface. The CoupAd server includes a CoupAd user interface, a CoupAd storage device for storing coupon data received by the CoupAd server from a CoupAd Central Server, and a CoupAd processor for controlling operation of the CoupAd server, the CoupAd user interface, and the CoupAd storage device. The CoupAd server is configured to perform a Lottery FreePlay recognition process which includes receiving from the POS scanner by means of the POS scanner connection point, scanned Coupad coupon barcode data from a Coupad coupon received from a consumer. The Coupad coupon barcode data including a retail product or a retail product family, a discount value code, and a FreePlay identifier code. The FreePlay identifier code is recognized by the CoupAd server and, based on this, the consumer is offered a choice of a Lottery FreePlay coupon in lieu of a discount on the retail product. When the consumer chooses in the affirmative, a Lottery FreePlay coupon is printed for the consumer in lieu of giving the consumer a discount on the retail product. The Lottery FreePlay coupon is redeemable at an authorized lottery booth for a lottery ticket having a purchase price based on the discount value code.

A method is further provided for providing consumer packaged goods and lottery promotions capability to a POS system. The POS system includes a POS user interface, a POS scanner for scanning retail product barcodes, a POS processor for controlling operation of the POS system, and a POS hardware interface. The POS hardware interface includes a POS processor connection point, a POS scanner connection point, and a POS user interface connection point. The method includes operatively connecting a CoupAd server to the POS system solely by means of the POS hardware interface, the CoupAd server including, a CoupAd user interface, a CoupAd storage device, and a CoupAd processor for controlling operation of the CoupAd server. The CoupAd server is configured to perform a Lottery FreePlay recognition process including receiving from the POS scanner by means of the POS scanner connection point, scanned Coupad coupon barcode data from a Coupad coupon received from a consumer. The Coupad coupon barcode data includes a retail product or a retail product family, a discount value code, and a FreePlay identifier code. The FreePlay identifier code is recognized by the CoupAd server and, based on this, the consumer is offered a choice of a Lottery FreePlay coupon in lieu of a discount on the retail product. Upon receiving an affirmative response from the consumer indicating a choice of the Lottery FreePlay coupon, a Lottery FreePlay coupon is printed for the consumer in lieu of giving the consumer a discount on the retail product. The Lottery FreePlay coupon is redeemable at an authorized lottery booth for a lottery ticket having a purchase price based on the discount value code.

BRIEF DESCRIPTION OF THE DRAWINGS

FIG. 12 is a diagram of a Food Stretcher promotion sheet according to concepts of the present application;

FIG. 13 is a diagram illustrating completion of a Food Stretcher promotion sheet according to concepts of the present application;

DETAILED DESCRIPTION

Described herein is a method and system for delivering coupons by a retailer to a consumer for obtaining a lottery ticket in order to play a lottery.

Figure 1:
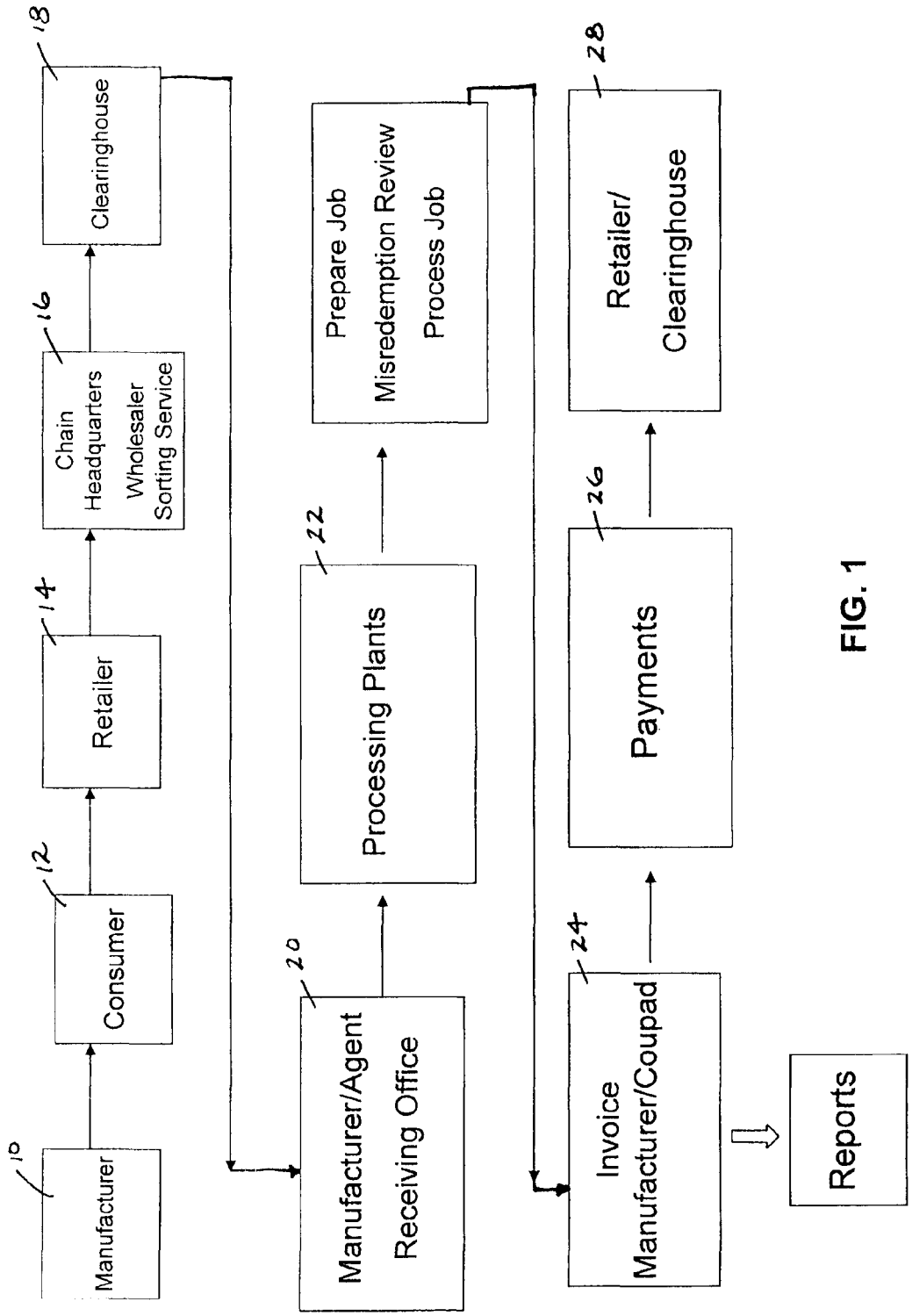
FIG. 1 is a prior art coupon flow diagram.

With reference to FIG. 1, a flow chart is provided which shows typical coupon processing flow as known in the art. A manufacturer 10 or other provider of consumer goods prepares coupons which are provided to potential consumers 12. These coupons are essentially certificates that provide consumers with discounts on goods or services when they are redeemed with a retailer 14. There are a number of coupons distribution methods known in the art. For example, coupon distribution methods include direct mail, in-store distribution, print media, in-pack and on-pack coupons, and indirect retailer advertising. Any of these methods are suitable for incorporating concepts of the present application. The coupons redeemed at a retailer location are then processed by, for example, retailer chain headquarters, a wholesaler, or a sorting service. After the coupons are collected and processed, they are generally provided to a clearing house 18 where they are then distributed to appropriate agents or receiving offices 20 of the manufacturer for processing by associated coupon processing plants or departments 22. The processing plants 22 typically prepare a job on a computer system, perform a misredemption review, and subsequently process the job. Misredemption occurs when someone attempts to redeem a coupon that is void for a product that he or she has not purchased. Methods and procedures performing misredemption review are known in the art and are therefore not discussed in further detail herein. Invoices are thereby provided to the respective manufacturer or distributor 24 who then makes payments 26 by means of a clearing house 28 or directly to the retailer 14 who redeems the coupons.

Figure 2:
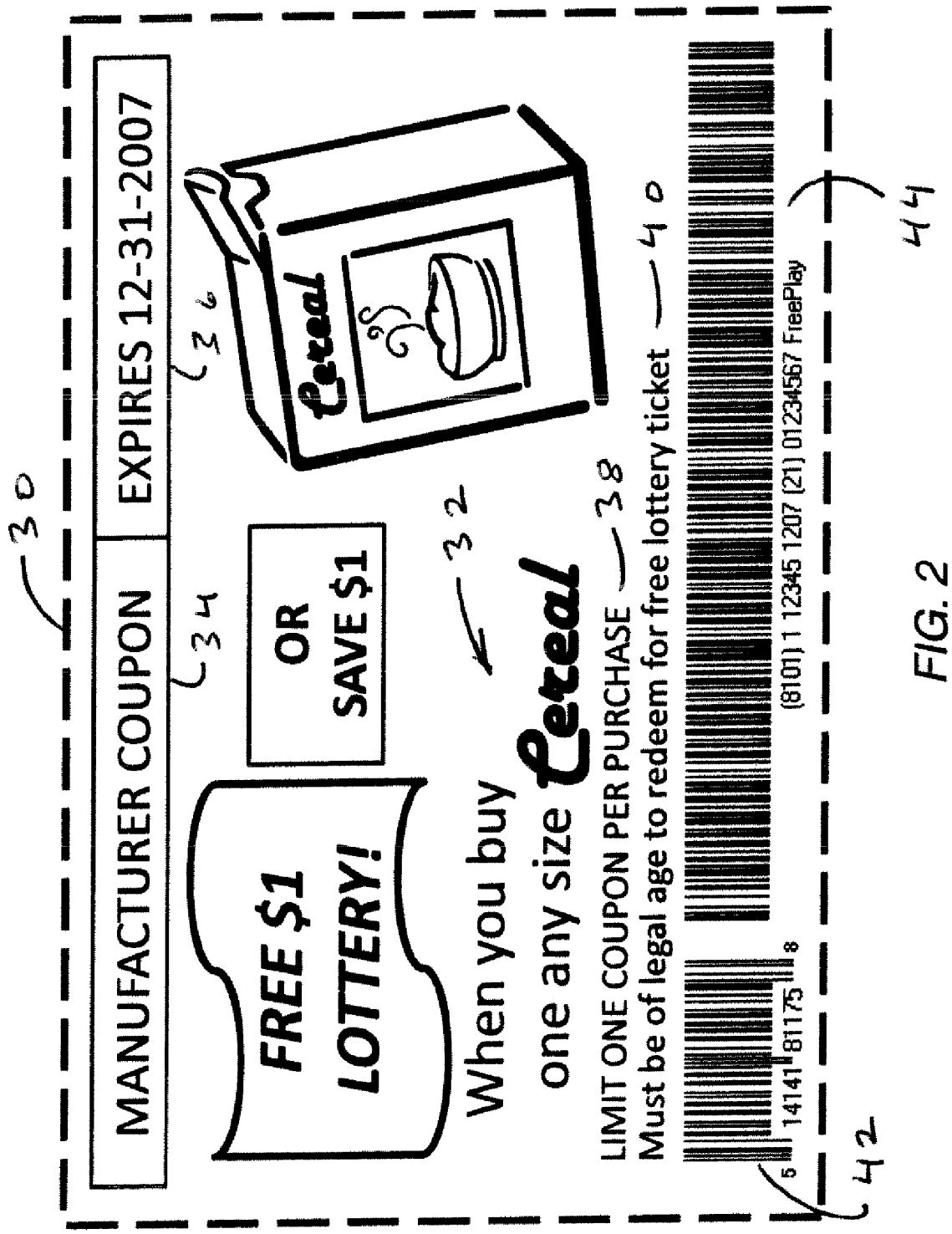
FIG. 2 is an exemplary coupon according to concepts of the present application.

With reference now to FIG. 2, there is shown an exemplary Coupad coupon 30 for illustrating concepts of the present application. Included on the Coupad coupon 30 are notifications that the holder may redeem the coupon either for a free $1 lottery ticket or for a savings of $1 based on the purchase of any size of an identified product as shown with reference to the numeral 32. It is to be understood that the Coupad coupon 30 is exemplary only, and the present application is not limited to the arrangement or verbiage shown on the exemplary Coupad coupon. Included on the Coupad coupon are standard notifications such as a manufacturer coupon identification 34, an expiration date certification 36, a limitation notice 38, and a legal age restriction 40 with respect to redemption for the free lottery ticket. There is also included on the Coupad coupon legal verbiage for consumer and retailer (to send coupon to a specific clearinghouse address for retailer) a Uniform Product Code of (U.P.C.) for identification of the manufacturer and/or the product family code. A system has been developed in the United States for product identification that is implemented with uniform product codes. This U.P.C. system is administered by a Uniform Code Council. A manufacturer interested in utilizing the U.P.C. system can register with the Uniform Code Council and receive a unique manufacturer code which, in this example, is included in the U.P.C. code 42. Once a manufacturer is registered, the manufacturer assigns codes to each of its own products. The U.P.C. of a product is a combination of the manufacturer's code and a product code or family code assigned by the manufacturer. To facilitate product identification, the U.P.C. is encrypted as a barcode and placed on a product where it is machine readable by, e.g., a scanner at a retailer checkout counter. The scanned information is then used to digitally identify the product, and once identified, the digital barcode information read therefrom may be communicated for accounting and inventory purposes as previously described with reference to FIG. 1.

Also included on the Coupad coupon 30, is what is referred to as a GS1-128 barcode. Global Standard 1 (GS1) developed the GS1-128 barcode to provide a global standard for exchanging data between different companies. The GS1-128 standard provides a method of defining the meaning of the data encoded in the barcode by defining a list of application identifiers (AIS). The GS1-128 barcode 44 incorporates data that facilitates aspects of the present application as described in further detail herein.

Figure 3:
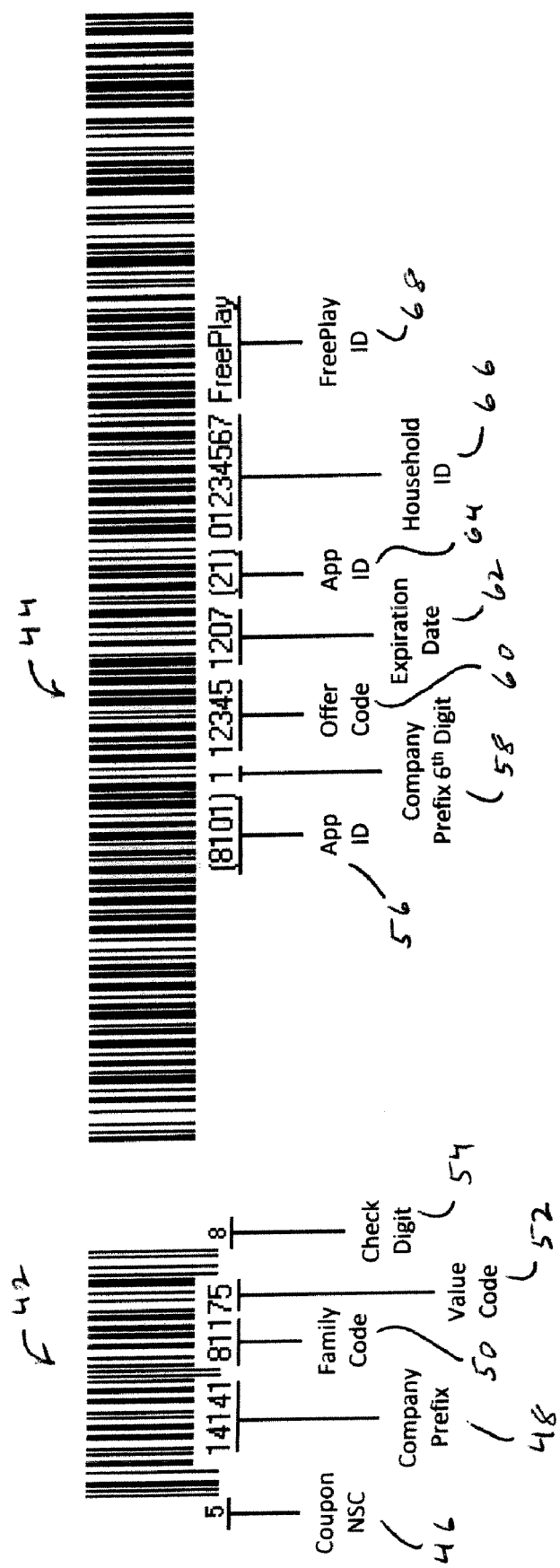
FIG. 3 is an exemplary coupon barcode according to concepts of the present application.

With reference now to FIG. 3, the U.P.C. barcode 42 and the GS1-128 barcode 44 are described in further detail. The U.P.C. barcode 42 incorporates a coupon indicator 46 as designated by the digit 5 as shown in the figure. Also incorporated in the U.P.C. barcode is a company prefix 48 indicating the first five digits of a manufacturer or company ID of the manufacturer sponsoring the respective coupon. A family code 50 is included to identify a product or a family of products for which the coupon is valid, and a value code 52 is included to identify the value of the coupon. The value code 52 is preferably encoded according to a standardized code provided by GS 1 US. For example, a code value of 76 represents a face dollar value of $1. Finally, the U.P.C. barcode 42 includes a check digit 54 which is a digit calculated from the other digits of the barcode used to check that the data has been correctly composed and interpreted by the scanner. The GS1-128 barcode 44 includes an 8101 application ID 56 and enables the representation of an offer code and expiration data. The 8101 application ID first includes a company prefix $6^{th}$ digit 58 representing the right-most digit of a company prefix whose first five digits are represented by the previously discussed company prefix 48. An offer code 60 is included enabling the manufacturer to provide additional coding related to the particular offer, and an expiration date 62 is included enabling the manufacturer to include a month and year in which the particular offer expires. Following the 8101 application ID 56 is a 21 application ID 64 which further includes an 8 digit household ID 66 and a FreePlay ID 68. The household ID 66 may be used to identify a particular locale, city, village, town, street, and may even identify a specific household. In one embodiment of the present application, the FreePlay ID 68 incorporates the word "FreePlay" as an indicator that this is a Coupad coupon according to concepts of the present application. It is to be understood, however, that the described embodiment is exemplary only, and does not limit it to the particular example shown for identifying the coupon as a Coupad coupon With reference now to FIG. 4, a front view of a bet slip 70 in accordance with an embodiment of the present application is illustrated. It will be appreciated that, in addition to providing a method of distributing Coupad coupons 30, the bet slip 70 illustrates a beneficial method of promoting bet slips as a vehicle for the sale of products shown on Coupad coupons. The consumer receives added value with the bet slip which will be of benefit to the consumer (because of the coupons attached) even if the bet slip is used to purchase a lottery number that is not the winning number. The bet slip 70 includes a perforation 71 for facilitating easy separation a supplemental portion of the bet slip 70 which, as illustrated, comprises the Coupad coupon 30. Once separated from the bet slip 70 by the consumer, the Coupad coupon 30 is used and processed as described elsewhere in this application.

Figure 5:
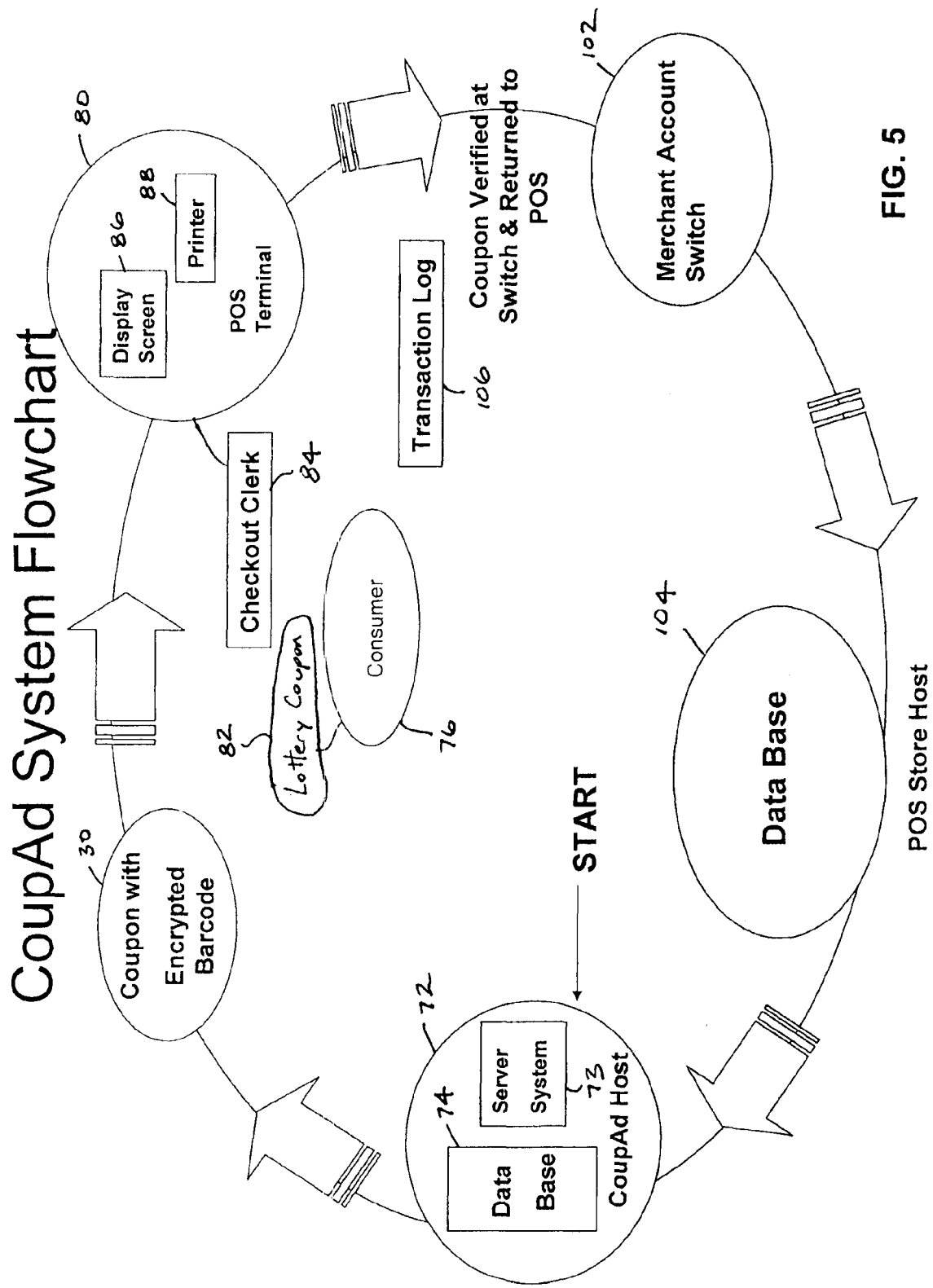
FIG. 5 is a flowchart of CoupAd processing according to concepts of the present application.

With reference now to FIG. 5, and with continuing reference to FIGS. 2 and 3 where identical numerals indicate similar elements, a summary flowchart is shown outlining processing of a Coupad coupon 30 according to an embodiment of the present application. A host system hereinafter referred to collectively as the CoupAd Central Server 72 including a server system 73 and a CoupAd database 74 generates necessary data for a Coupad coupon with a U.P.C. barcode 42 and a Coupad barcode 44 identifying the Coupad coupon 30 as a Coupad coupon. The Coupad coupon may be printed and distributed to consumers by any means known in the art. For example, the coupons can be printed at the CoupAd Central Server 72 and distributed at the request of manufacturers or retailers, or the coupon information can be communicated to various CoupAd servers 80 for printing and distribution by the retailers. Coupons distributed in electronic form are also included within the scope of the present application. For example, retailer web sites may contain images of the coupon which can be downloaded from the web site and printed by a consumer. Data describing details of the generated Coupad coupon 30 is preferably stored in the CoupAd database 74 of the CoupAd Central Server 72 for future reference and processing such as, e.g., authentication processing. A consumer 76 subsequently presents the Coupad coupon 30 for redemption at a retail point of sale (POS) terminal 78. The Coupad coupon is scanned by the POS 78 and a processing system in communication with the POS 78, hereinafter referred to as CoupAd server 80, receives the U.P.C. code 42 and FreePlay barcode 44 and thereby offers the consumer 76 the option of redeeming the Coupad coupon 30 for the amount indicated by the value code 52 or receiving a lottery coupon with lottery serial numbers attributed to the coupon to avoid duplication of the coupon and any fraud or misrepresentation, and when presented to the lottery counter in the retail store it will be exchanged for a lottery ticket 82 in place of the cash amount. It is to be understood that the CoupAd server 80 communicates this option either to a checkout clerk 84 or directly to the consumer 76 by means of a display screen 86 in the event that the consumer is checking out at a self-service checkout location as known in the art. Of course, in the event that the consumer opts to receive a new lottery ticket, the CoupAd server 80 will also require verification of legal age of the consumer by receiving an appropriate response either from the checkout clerk 84 or the consumer 76. When the consumer 76 opts to receive a Lottery FreePlay coupon 82, the CoupAd server 80 utilizes a printer 88 included in the CoupAd server for printing the Lottery FreePlay coupon. Alternately, in some embodiments, the CoupAd server 80 utilizes a printer included as part of the retail POS system 78. As such, the Lottery FreePlay coupon can also be printed directly on the receipt that is generated by the POS system, either on the front or the back of the receipt.

The CoupAd Central Server 72 preferably has, in addition to connections to each CoupAd server, a web interface for maintaining the CoupAd database 74. Thus, additions, deletions and changes to current Coupad coupon offers can be maintained periodically via the web interface, although other means of database maintenance such as, e.g., batch processing fall within the scope of the present application. Revisions to the CoupAd database 74 are communicated to the various CoupAd servers 80 periodically or as necessary. The CoupAd database 74 preferably stores the information necessary for control and operation of the coupon system described herein. For example, the CoupAd database 74 preferably stores the following database tables:

Retail Stores Table containing information relevant to each participating retailer such as, e.g., store number, contact information, clearing house ID, coupon agent ID, etc.;

Coupad coupon table containing, e.g., FreePlay coupon ID, manufacturer's company prefix, coupon family code, coupon value code, offer code, expiration date, household ID, and a FreePlay identifier string such as, e.g. "FreePlay";

Lottery FreePlay coupon table containing, e.g., a FreePlay ID coordinated with a lottery commission, Internet Protocol (IP) addresses for CoupAd servers, manufacturer's company prefix, coupon family code, coupon value code, offer code, and household ID;

CoupAd server table containing, e.g., CoupAd server IP address, store numbers, register numbers, and printer numbers;

State Lottery Table containing, e.g., State lottery commission ID using an ISO identification;

Lottery Outlet table containing, e.g., State Lottery commission ID, contact information, etc.;

Clearinghouse table containing, e.g., clearinghouse ID, names, contact information, etc.;

Manufacturer's Agent table containing, e.g., agent number, name, contact information, etc.;

Manufacturer's Company Prefix table containing, e.g., manufacturer's company prefix, and an interface to GEPIR; and General Ledger table containing, e.g., general ledger account numbers, names, and balances.

The CoupAd server 80 preferably includes a storage device for maintaining data necessary for processing the Coupad and Lottery FreePlay coupons. The maintenance of this data is preferably accomplished by means of a web connection through which data can be received from the CoupAd Central Server 72. Input to the CoupAd server 80 received from the CoupAd Central Server 72 includes CoupAd database 74 additions, deletions, changes, and revisions to the tables stored therein. It is to be appreciated that a particular CoupAd server 80 need not store the entire set of data stored in the CoupAd database 74, but instead may only store data relevant to the particular retailer utilizing the CoupAd server 80.

Figure 6:
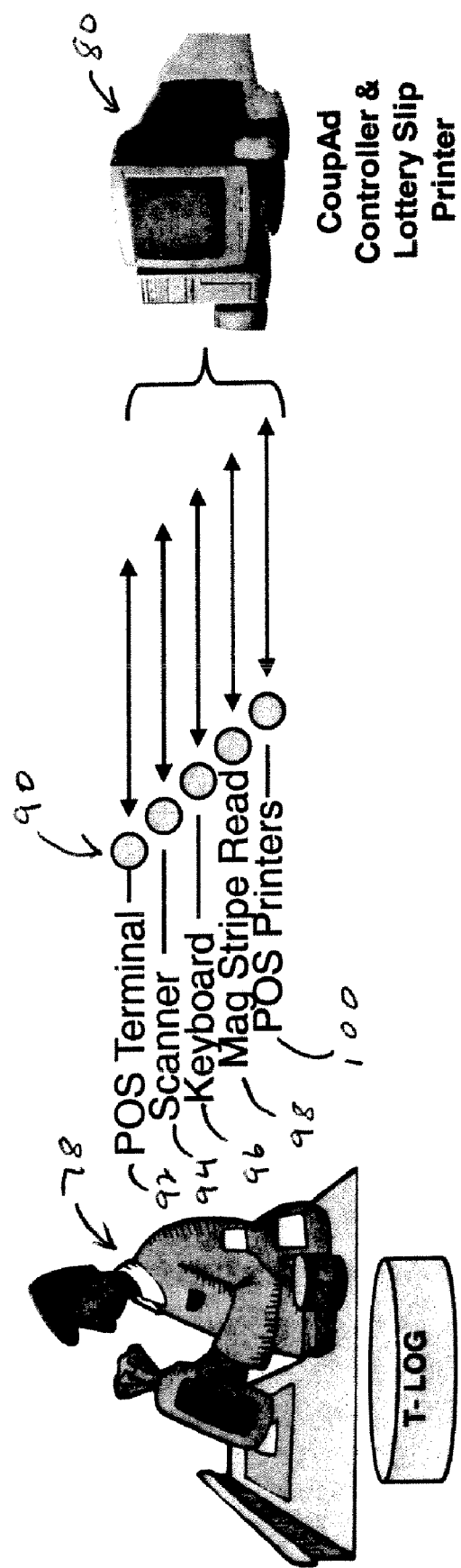
FIG. 6 is an exemplary hardware interface according to concepts of the present application.

With reference now to FIG. 6 and continuing reference to FIG. 5, the CoupAd server 80 is connected by means of electronic connectors cables or straps 90 to various components of the POS system 78. In various embodiments, the CoupAd server 80 can be connected to the POS terminal 92, a POS scanner 94, a POS keyboard 96, a POS magnetic stripe reader 98, and a POS printer 100. A particularly advantageous feature of embodiments of the present application is that the CoupAd server 80, communicating with the POS system 78 by means of the straps 90, is able to perform all the necessary communication without making changes to existing POS system software. The CoupAd server 80 connects to the POS system 78 through known electronic hardware connections, i.e., straps 90, and is able to control the required data input, processing, and printing by means of software within the CoupAd server 80. The CoupAd server 80, for example, is able to observe the data screen of a transaction at the POS system 78 and have available information from, e.g., a magnetic stripe reader 98, the scanner 94, and/or the keyboard 96. The CoupAd server 80, as previously mentioned, can also utilize the POS printers 100 although preferred embodiments include the aforementioned CoupAd printer 88 as part of the CoupAd server 80. The CoupAd server 80 utilizes the database tables stored in the CoupAd database 74 for verification of the validity of the Coupad and Lottery FreePlay coupons 30. For example, the CoupAd server can use the Coupad coupon table to verify the coupon value code, offer code, and expiration date. Alternately, the CoupAd server 80 is able to communicate by means of a merchant account switch to a POS store host system 104 for communicating back to the CoupAd Central Server 72 for verification of the validity of the Coupad coupon 30. The present application is not limited with respect to the particular data used for verification. When a Coupad coupon 30 is verified as being a valid coupon, the consumer 76 has the option to receive a printed Lottery FreePlay coupon 82 which the consumer is later able to redeem at an authorized lottery station for a lottery ticket of the specified value. Further, the transaction as written to a transaction log 106 of the POS system 78, and the CoupAd server 80 records an audit trail of processed Coupad and Lottery FreePlay coupons.

Figure 7:
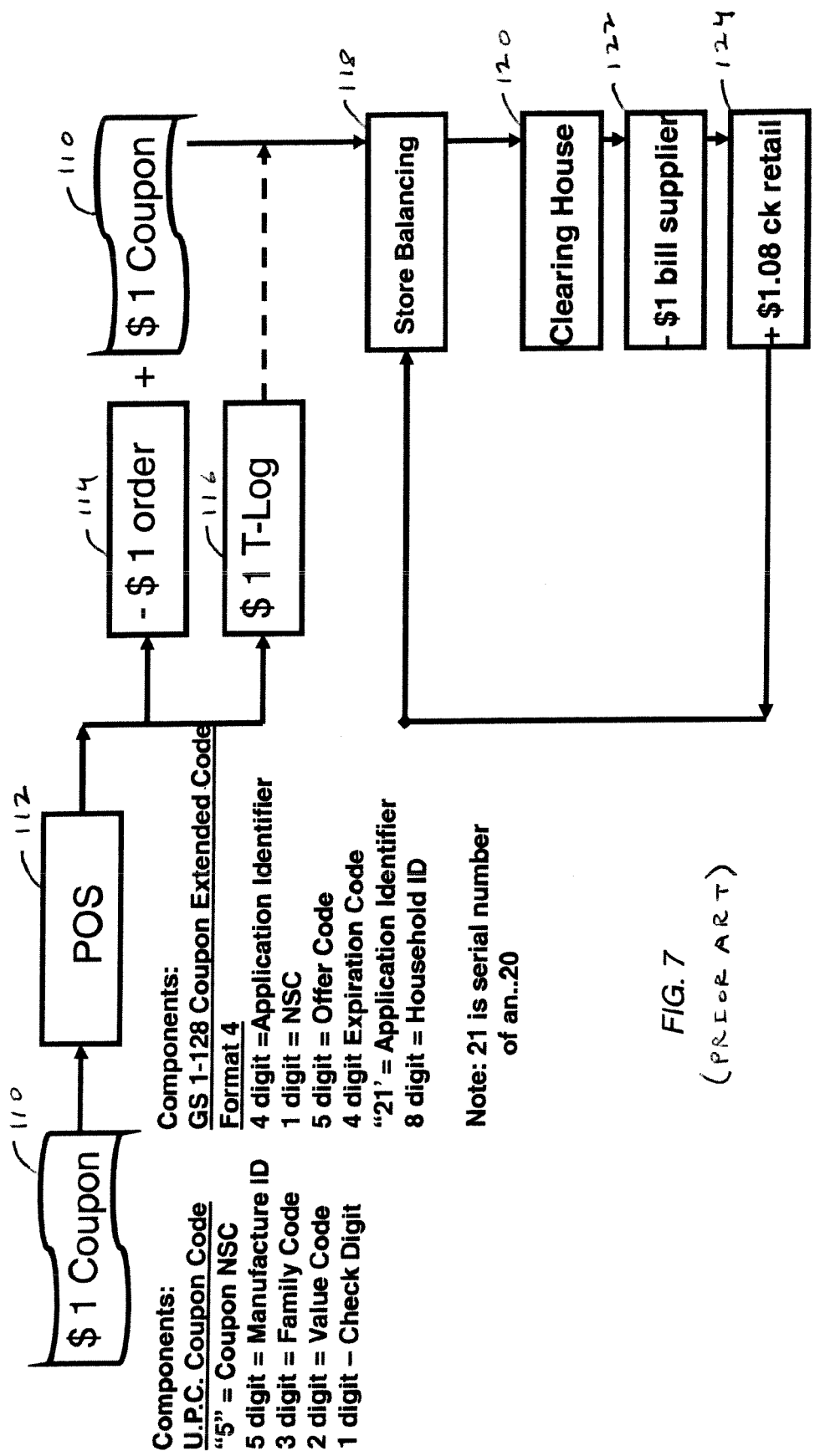
FIG. 7 is a prior art diagram of store balancing.

When coupons are redeemed at a retailer, the retailer includes the redeemed coupon in its store balancing procedures. The balancing procedures for a Coupad coupon in embodiments of the present application are somewhat different than the balancing procedures for a prior art coupon. In order to describe the differences in the balancing procedure, a typical method of retail store balancing of a prior art one dollar coupon is first shown with reference now to FIG. 7 and continued reference to FIGS. 3-5. A prior art coupon 110 is presented to the retailer at a POS station 112. It is to be appreciated that the POS station 112 recognizes the presented coupon 110 to be a prior art coupon by, e.g., the absence of the FreePlay identifier 68 as shown in FIG. 3. Consequently, the POS station 112 records a one dollar order 114 and makes a one dollar entry into the transaction log 106. The physical coupon 110 is then forwarded for store balancing 118 which is typically performed daily by most retailers. The Coupon 110 is then packaged with other coupons presented to the retailer and forwarded to a clearing house 120. The clearing house 120 then presents a bill 122 for the one dollar prior art coupon to the manufacturer or supplier originating the coupon. Finally, a check for the one dollar plus a handling fee, e.g., one dollar plus 8 cents, is sent to the retailer where the coupon was redeemed. It is to be appreciated that store balancing and clearing house procedures are more detailed than shown, and that many coupons may be batched or grouped for lump sum payments, however, these procedures are well known in the art and are not relevant to the present application and are, therefore, not described in detail herein.

Figure 8:
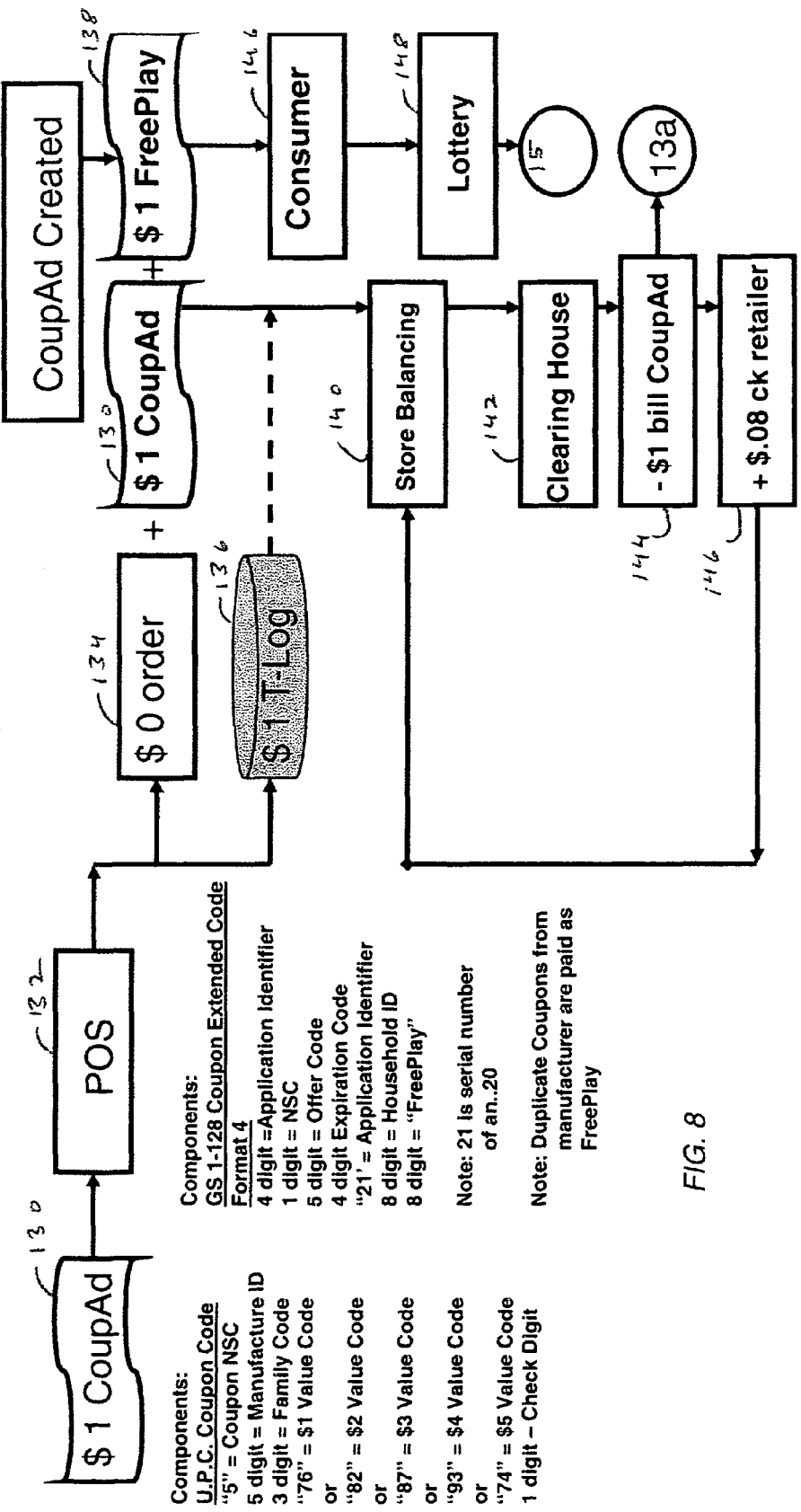
FIG. 8 is a diagram of store balancing according to concepts of the present application.

With reference now to FIG. 8, a suitable method of retail store balancing of a one dollar Coupad coupon according to an embodiment of the present application is now shown. A Coupad coupon 130 is presented to the retailer at a POS station 132. In this example, the POS station 132 recognizes the presented coupon 130 to be a Coupad coupon by, e.g., the presence of the previously discussed FreePlay identifier 68. If of legal age, the coupon presenter is offered the choice of redeeming the coupon for one dollar as with the prior art coupon, or redeeming the coupon for a Lottery FreePlay coupon. In the first choice, the retailer store processing and balancing may proceed as previously described for the prior art coupon. However, if the presenter chooses to receive a Lottery FreePlay coupon, processing continues as described here and shown in FIG. 8. The POS station 132 records a zero order 134 in this case because the Coupad coupon is not being redeemed for a cash discount. However, a one dollar Lottery FreePlay coupon 138 is printed at the POS station, and a one dollar entry is thus entered into the transaction log 136. The physical coupon 130 is also forwarded for store balancing 140 and packaged with other coupons presented to the retailer and forwarded to a clearing house 142. However, rather than presenting a bill to the manufacturer or supplier as with the prior art coupon, in some embodiments, the clearing house 142 instead presents a bill 144 for one dollar to the company hosting the Coupad Central Server 72 controlling the Coupad coupon processing, the company hereinafter referred to as CoupAd. CoupAd then, e.g., through a previously agreed arrangement, can bill the manufacturer or supplier originating the coupon for reimbursement of the one dollar. Finally, a check for the handling fee, e.g., 8 cents, is sent to the retailer where the coupon was redeemed. It is to be appreciated that store balancing and clearing house procedures shown are exemplary only and the present application is not so limited. Any suitable arrangement for balancing and billing as known in the art may be used.

The generated Lottery FreePlay coupon 138 is presented to the consumer 146 who presented the Lottery FreePlay coupon 130 for redemption. At the consumer's convenience, the Lottery FreePlay coupon 138 is redeemed at an authorized lottery station 148 for a one dollar lottery ticket. It is to be appreciated that the consumer may redeem the Lottery FreePlay coupon for a lottery ticket at any time and may, in fact, never redeem it at all. However, for purposes of store balancing, the transaction is complete when the Lottery FreePlay coupon is issued to the consumer. The Lottery FreePlay coupon preferably operates similar to a lottery scratch-off ticket. For example, with reference now to FIG. 9, a Lottery FreePlay coupon 150 can contain a UPC barcode 152 similar to the UPC barcode 42 previously described. Similarly, the Lottery FreePlay coupon UPC barcode encodes a company prefix, however, this company prefix identifies the company as an authorized printer/provider of the Lottery FreePlay coupon and is usually a different value than the manufacturer company prefix 48. The particular company prefix used would be coordinated with and authorized by GS1. Further, preferably encoded on the Lottery FreePlay coupon UPC barcode is an item code identifying the coupon as a Lottery FreePlay coupon and the monetary redemption value of the coupon, e.g., one dollar.

The Lottery FreePlay coupon additionally contains a serial number barcode 158 allocated by the appropriate lottery commission, e.g., state commission. The lottery commission provides serial numbers for serializing scratch-off tickets. In a similar fashion, the lottery commission could allocate a range of serial numbers for use on Lottery FreePlay coupon so that the coupon could also be serialized. When redeeming the Lottery FreePlay coupon 150, the serialized barcode is scanned and validated against a database to determine that it is a valid Lottery FreePlay coupon, if the coupon is valid, a lottery ticket is given in exchange for the coupon at the value of the coupon. Thus, the Lottery FreePlay coupon provider would coordinate with the lottery commission to provide a database including valid serial numbers and associated values. These attributes on the Lottery FreePlay coupon prevent coupon fraud and misrepresentation and assure that the Lottery FreePlay coupon will be used only once. As an additional embodiment of the Lottery FreePlay coupon, there is an automated lottery number generator that represents the six online lottery games played. For example, for the six lottery games played, the Coupad server will generate unsolicited numbers that represent each game. This automated number generator for coupons is not found in the prior art.

Figure 9:
FIG. 9 is an exemplary Lottery FreePlay coupon.
Figure 10:
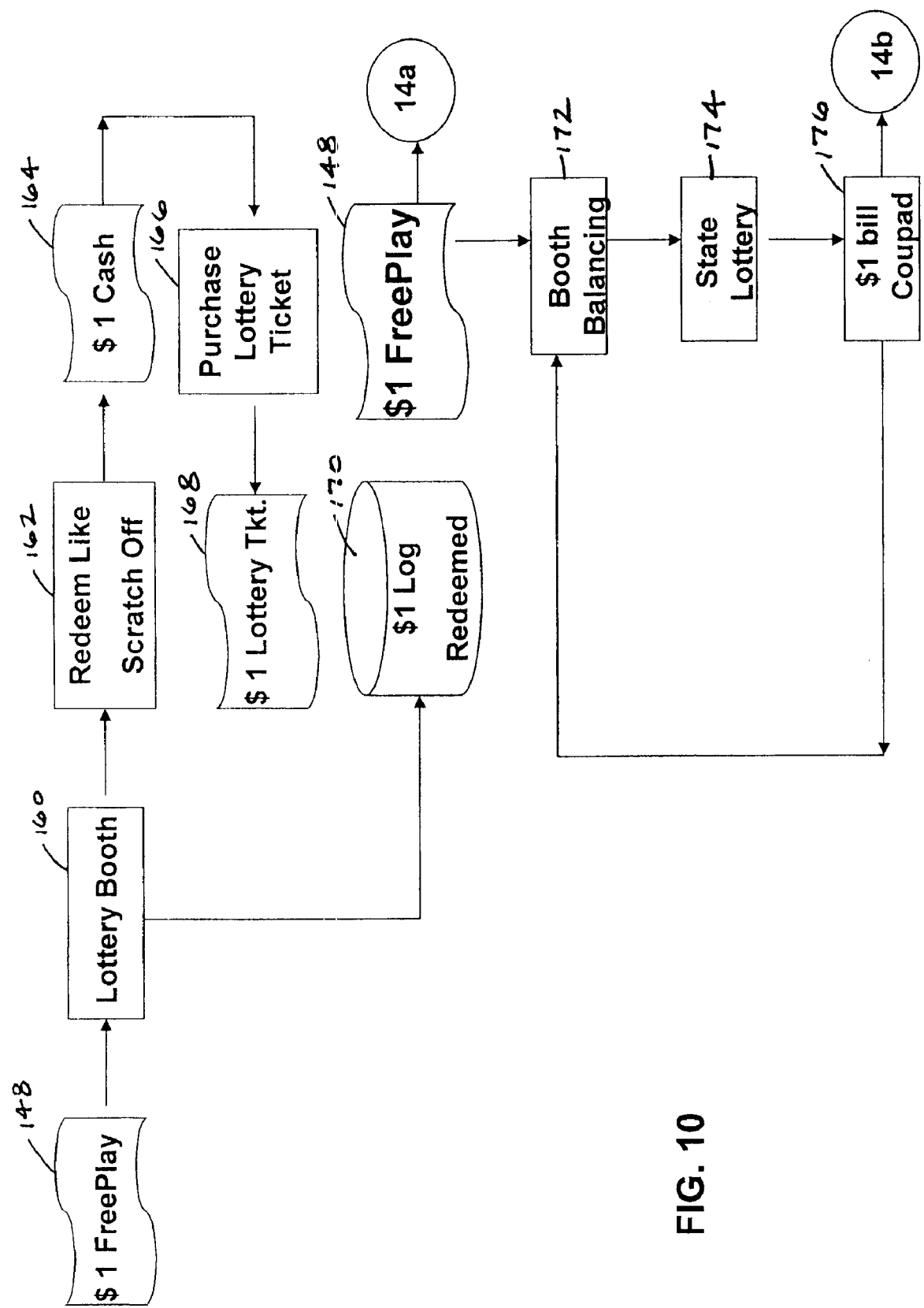
FIG. 10 is a diagram of lottery booth processing according to concepts of the present application.

With reference now to FIG. 10, and continuing reference to FIGS. 8-9 where like numerals represent like elements, an exemplary method of redemption of a Lottery FreePlay coupon 148 at an authorized lottery commission booth 160 is shown. The Lottery FreePlay coupon is presented for redemption (162) in a manner similar to the aforementioned scratch-off ticket. The coupon is redeemed for the value associated with the serial number barcode 158, e.g., one dollar 164. However, bases on the serial number, the redeemer does not receive the monetary value in cash form, but instead the monetary value is used to purchase 166 a lottery ticket 168 having a purchase price equal to the specified monetary value. The lottery booth records the transaction in a transaction log 170 as a redemption for the specified monetary value. The Lottery FreePlay coupon 148 is also submitted to booth balancing 172, e.g., a daily balancing process for the lottery booth 160, and is further submitted to the appropriate lottery commission 174, e.g., state lottery commission, and the commission 174 then presents a bill to CoupAd 176 for the amounts redeemed.

Figure 11:
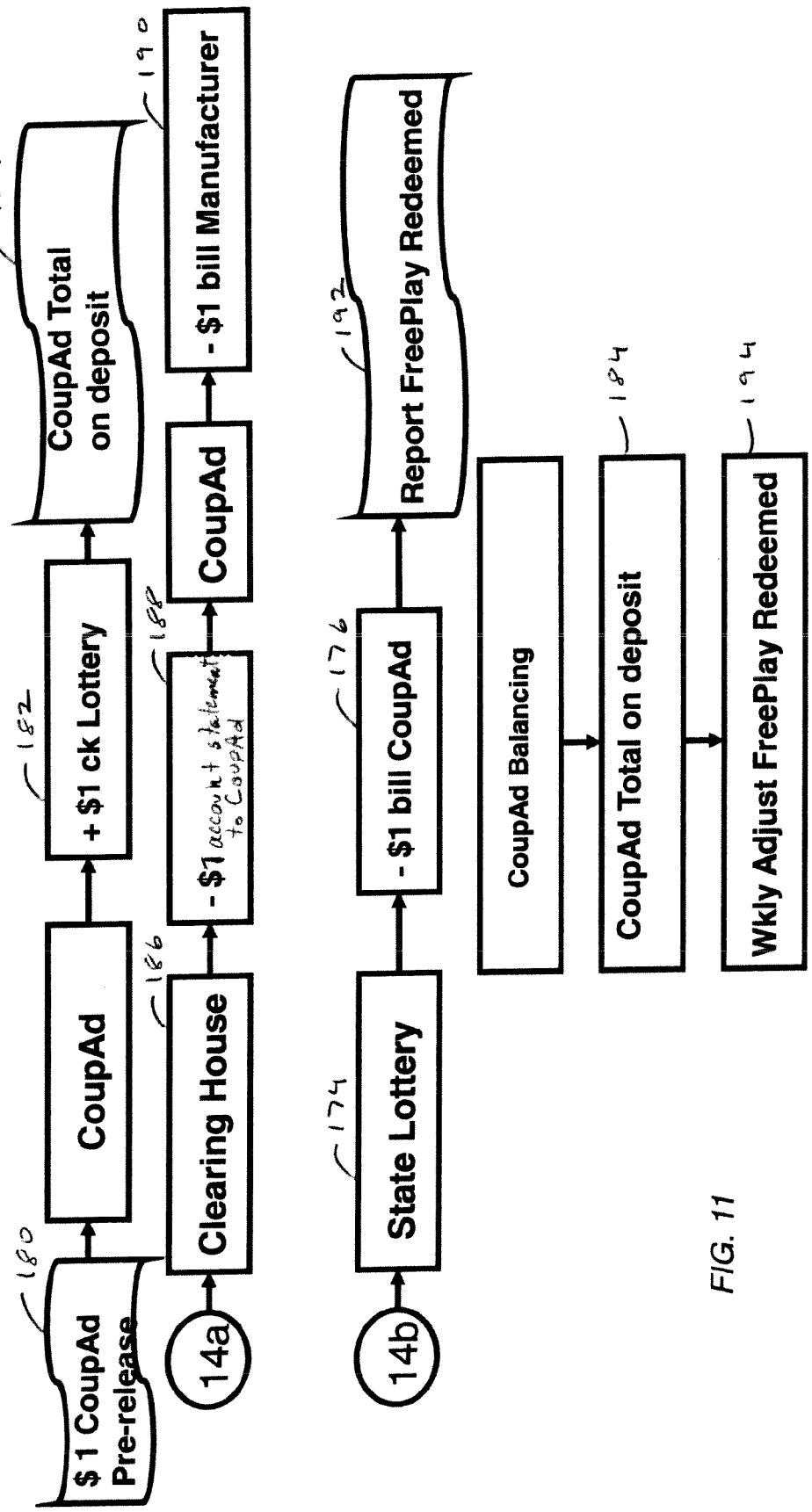
FIG. 11 is a diagram of final balancing according to concepts of the present application.

With reference now to FIG. 11, and continuing reference to FIGS. 8-10 where like numerals represent like elements, an exemplary method of final balancing is shown. For the CoupAd pre-release coupons 180, i.e., coupons that are intended to be issued to consumers, CoupAd places on deposit 182 an amount representative of the pre-release coupons with the appropriate lottery commission. A CoupAd total on deposit 184 is maintained at the lottery commission and the deposited amount is added to this total. Redeemed Lottery FreePlay coupons 148 are forwarded to a clearing house 186 which provides a statement to CoupAd 188 for the coupon redemption value, and CoupAd in turn bills the manufacturer 190 offering the coupon in accordance with the statement. The clearing house provides a check for the manufacturer to make sure that CoupAd properly bills the manufacturer and could be validated against CoupAd's server.

As part of the booth balancing shown in FIG. 10, it was described that the lottery commission 174 presents a bill to CoupAd 176 for the amounts redeemed. A report of Lottery FreePlay coupons redeemed 192 is generated based on results of this process. Additionally, the CoupAd total on deposit 184 would be adjusted periodically 194, e.g., weekly, based on the total amount of Lottery FreePlay coupons redeemed. It is to be appreciated that the processing diagrams shown in the figures are exemplary only, and the arrangement shown represents only one possible scenario, and other scenarios and other arrangements of processing which accomplish the methods described herein fall within the scope of this application.

Concepts of the present application can also be applied with good efficacy to consumers using electronic food stamps or participants in the Women, Infants, and Children (WIC) program using WIC cards. In general, concepts of the present application can be applied to users of any form of Electronic Benefits Transfer (EBT) card. With reference now to FIG. 12, an exemplary Food Stretcher electronic food stamps/WIC promotion sheet 200 according to one embodiment is shown. For purposes of explaining the Food Stretcher program, the program is first described with reference to printed promotion sheets, and later described more generally with reference to an essentially paperless system. The Food Stretcher promotion sheet 200 contains a number of different product offerings 202a-202b that are herein referred to as bundles 202. These bundles contain one, two or more coupon-like manufacturer's offerings. The Food Stretcher promotion requires that each product offering within the bundle listed on the sheet must be purchased with a government electronic benefits magnetic card and be, e.g., the 75th person qualifying with these exact purchases as illustrated in a rules portion 204 of the Food Stretcher promotion sheet. Of course, the number 75 and the number of bundles illustrated are only exemplary, and any arbitrary number of each falls within the scope of this application. The Food Stretcher promotion sheet includes identification numbers, shown as barcodes 206a-206b in the figure. The first barcode 206a includes identifying information such as, e.g., a code representative of a store coupon, a company prefix, and a value code. The second barcode 206b includes an application ID serial number unique to the Food Stretcher electronic food stamps/WIC promotions. Of course, although two barcodes are shown, the encoded information may be provided in a single barcode, any number of barcodes, or in other forms known in the art.

Upon satisfaction of the requirements stated in the rules portion 204, the CoupAd Server 80 prints a CoupAd Food Stretcher coupon 208 as shown with reference now to FIG. 13. For example, when the Food Stretcher promotion sheet is presented at the POS terminal 78, the CoupAd server 80 verifies that the qualifying products 202a-202b have been purchased, verifies that the complete bundle 202 has been satisfied, and validates other qualifying information such as, e.g. expiration date, serial number, legal use of EBT card, and that the consumer is the $75^{th}$ (or $N^{th}$) consumer to complete the bundle. Upon successful verification, the Food Stretcher coupon 208 is printed on either of the CoupAd printer 88 or the POS printer 100.

The Food Stretcher coupon 208 also includes identification numbers, shown in the exemplary figure as barcodes 210a-210b. The first barcode 210a includes identifying information such as, e.g., a code representative of an in-store coupon, a company prefix, a family code, and a value code. The second barcode 206b includes, e.g., a serial number, a company prefix digit, an offer code, and an expiration date. Again of course, although two barcodes are shown, the encoded information may be provided in a single barcode, any number of barcodes, or in other forms known in the art. For the in-store coupon shown, on a subsequent visit to the same store, the consumer may redeem the CoupAd Food Stretcher coupon 208 and receive the stated amount, e.g. $10, off their order. The CoupAd Food Stretcher coupon 208 is formatted like a manufacturer's coupon, similar to the previously described Coupad coupon 30 and is similarly processed through the coupon clearinghouses with an identification of CoupAd.

Figure 13A:
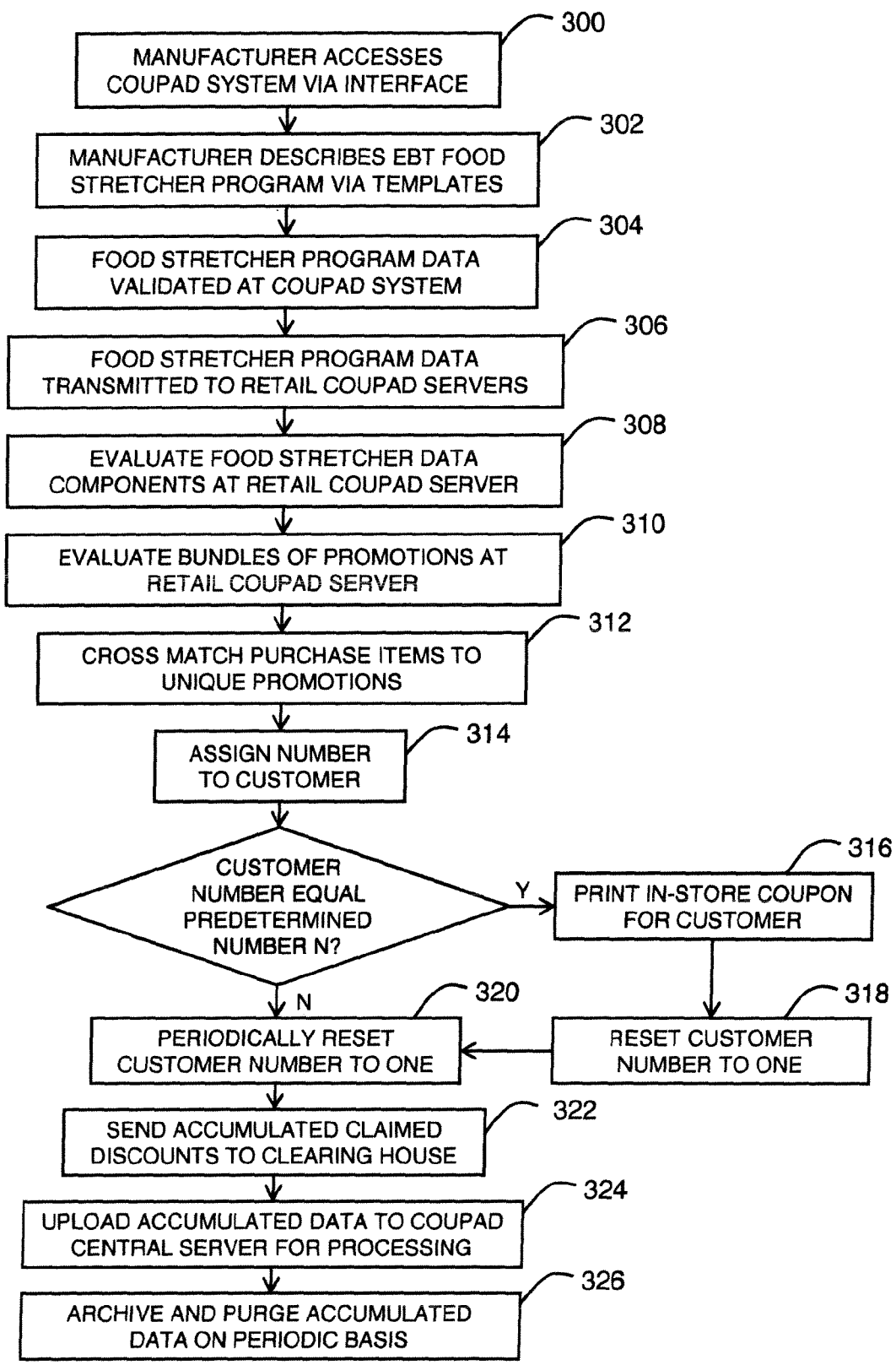
FIG. 13A is a flow diagram of a Food Stretcher promotion according to concepts of the present application.

With reference now to FIG. 13A, the Food Stretcher promotion is now described in more detail with reference to a preferred paperless system. An interface is provided for manufacturers to access the Coupad Central Server (HTTP/HTTPS) since the promotions normally originate from the manufacturers. This interface enables a manufacturer such as, e.g., Kraft, P&G, etc., to access a secure web account (step 300) for the purpose of establishing a set of promotions/discounts. The promotions are preferably in the form predefined templates allowing regular coupons, mix-n-match, cross-promotions, and more complicated coupons to be used (step 302). After a validation of the promotion is completed, e.g., by the Coupad Central Server (step 304), the manufacturer's EBT Food Stretcher data file for the promotion is transmitted to the appropriate in-store Coupad servers 80 for processing (step 306).

The EBT Food Stretcher data file sent to the predefined Coupad Servers is further evaluated for processing components. For example, when a promotion data file "goes live", it is evaluated on a transaction by transaction basis (step 308). A transaction is defined as consumer items being processed by a cashier for tendering. Since the promotions which are designated by the manufacturers, are essentially the same, the in-store Coupad Server distinguishes how the promotion is to be processed, and by what type of "trigger". The initial "trigger" for the EBT Food Stretcher program is the reading of the customer's EBT card at the POS 78. This "trigger" is different than the Lottery FreePlay program that is initiated by the "swipe" of a barcode on the Coupad Coupon. In the case of the EBT/Food Stretcher program, once the customers' EBT card is read and validated, predefined "bundles" of manufacturer promotions are evaluated (step 310). These predefined bundles are described in the manufacturer's EBT Food Stretcher data files transmitted to the Coupad servers.

As the consumer's purchases are itemized, the items are cross-matched with the unique promotions (step 312) and a number (N) is assigned to the customer. If the correct criteria are matched, an additional check for the EBT/Food Stretcher program is performed as to the current number N assigned to that particular customer (1-n) in order to qualify for the second stage of the EBT/Food Stretcher program (step 314). That is to say, if the resultant customer number is equal to a predefined variable number, an in-store coupon is printed and given to the customer for their use the next time the customer shops at that same store (step 316). The in-store coupon will be in the form of an in-store tender certificate/coupon with an amount applicable to the next shopping visit by the customer. In preferred embodiments, no partial or unused amounts are carried over to future shopping visits. When the predefined number is reached, the customer number starts over at a value of one (step 318) and is preferably reset every day at midnight in that store (step 320).

These redeemed EBT/Food Stretcher coupons given to the customers can be printed in a paper form at the discretion of the store, e.g., for the purpose of further "till" balancing or as an additional check against an electronic clearing statement, or a file can be simply maintained as an archival file for future reference. The EBT Food Stretcher data accumulated by the Coupad Server will be reformatted, and the claimed discounts will be sent on electronically to a clearing house for clearing and settlement with the manufacturers and retailers (step 322). The data accumulated by the in-store Coupad Servers will be uploaded to a central Coupad Server for any further processing (step 324).

As a part of the in-store promotion evaluation, the promotion's termination date is one of the criteria used to determine when the promotion starts, ends and when it is discarded. The daily reports which are needed by the various manufacturers, are produced by the Coupad Central Server (72) and can be accessed by the individual manufacturer via the same web secure link interface as was used to define the original promotional discounts. The data is archived and "purged' on a predefined basis both on the in-store Coupad Server and at the central Coupad Server (step 326).

To insure security in the process, no customer financial data is stored either on the Coupad Central Server (72) or the in-store Coupad Servers (80). This assists in circumventing financial certification required by, e.g., the card Acquirer's (VISA, Mastercard, AMEX, etc.).

Figure 4:
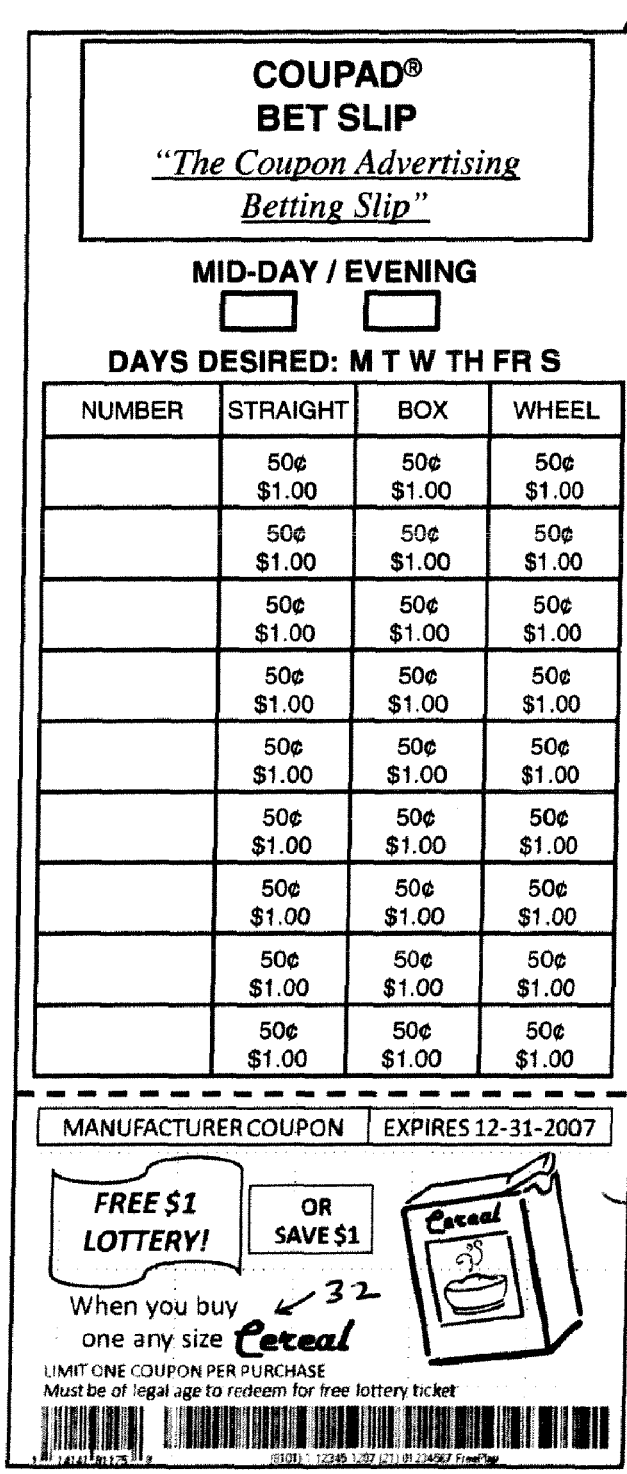
FIG. 4 is an exemplary bet slip including a coupon according to concepts of the present application.
Figure 14:
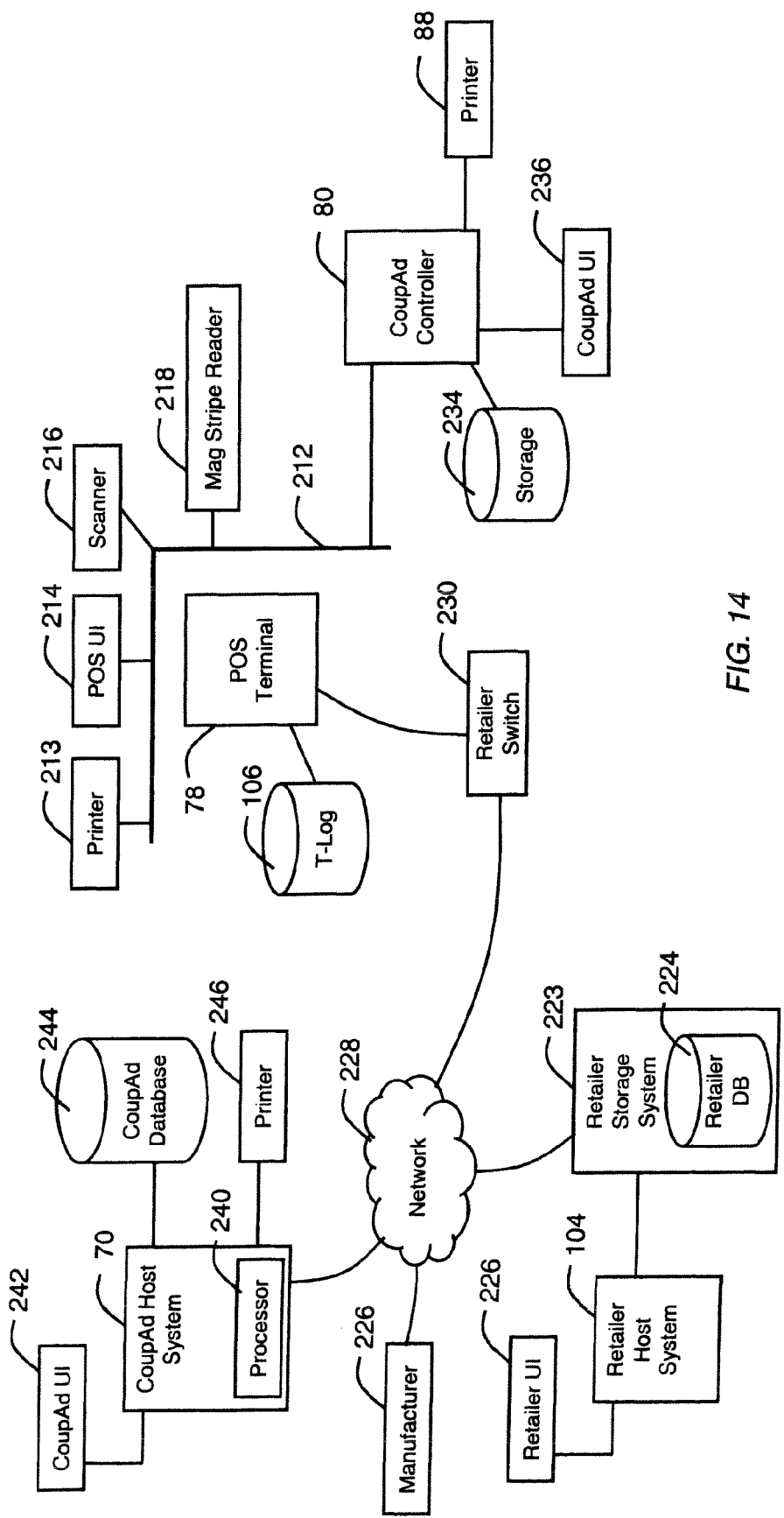
FIG. 14 is a block diagram of a system incorporating aspects of the present application.

With reference now to FIG. 14, and continuing reference to FIGS. 4-5, an exemplary system is shown incorporating concepts of the present application. A POS terminal 78 is connected by means of a hardware interface 212 to a POS printer 213, a user interface 214, a scanner 216, and a magnetic stripe reader 218. The POS terminal 78 is a POS terminal as known in the art. The printer 213 is used, e.g., for printing receipts and coupons. The hardware interface 212 includes connection points such as, e.g., straps 90. The user interface 214 includes, e.g., a keyboard for entering amounts, identification numbers and other information, and the user interface typically includes one or more display screens. The scanner 216 is included for scanning barcodes encoded on store merchandise, coupons and other items such as, e.g. store discount cards. The magnetic stripe reader 218 is typically used for reading credit card information and other magnetically coded information. The food stamp and WIC shopper or any user of an EBT card is identified through this magnetic stripe reader method when purchasing their products. Further connected to the POS terminal 78, either directly or by means of the hardware interface 212 is a storage device for a transaction log 106 which is used, e.g., to record transactions for daily balancing and auditing purposes.

The POS terminal 78 is shown in communication with a retailer host system 104 which includes a storage system 223 including at least a retailer database 224. The retailer database 224 is typically used for storing pricing information and for tracking inventory of store merchandise. The retailer host system is also shown including a retailer host user interface 226 used for administration of the retailer host system. While the retailer host system 104 is shown to be in communication with the POS terminal 78 by means of a network 228, e.g., the Internet, through a retailer switch 230, it is to be appreciated that other arrangements fall within the scope of the present application. For example the retailer host system 104 may be connected to the POS terminal 78 by means of a local area network. Concepts of the present application apply as well to standalone POS terminal systems operating without a separate host system. It is also to be understood that the present application is described with reference to multiple POS terminals and multiple respective CoupAd servers or with reference to multiple POS terminals connected to a single CoupAd server. The figure shows only one exemplary configuration for the purpose of describing aspects of the present application.

A system referred to and previously described herein as a CoupAd server 80 is in operative communication with the POS terminal 78 and other components of the POS system such as, e.g., the printer 213 and the scanner 216 by means of the hardware interface 212. The CoupAd server is preferably connected to or otherwise includes a storage device 234 for storing coupon data received from the CoupAd Central Server 72, a user interface 236, and a printer 88. In preferred embodiments, no modifications to the POS terminal 78 or its above-described connected components are necessary. The CoupAd server 80 is configured such that it is able to communicate with the POS terminal 78 and its components by means of the hardware interface 212. That is to say, the CoupAd server is able to receive and send all of the necessary information for operation of the previously described concepts of the present application without requiring modification to existing POS terminal systems. For example, the previously-described Lottery FreePlay coupon can be printed on the POS printer 213 if the POS printer is of sufficient capability. However, in preferred embodiments, the Lottery FreePlay are printed on the CoupAd printer 88.

As previously described in conjunction with FIG. 6, the CoupAd server 80 communicates with a CoupAd Central Server 72 for performing aspects of the present application such as, e.g., validating Coupad coupons presented for redemption at the POS terminal 78. The CoupAd Central Server 72 preferably includes a processor 240 for controlling operation of the CoupAd host system, a user interface 242, a storage system 244 including at least a CoupAd database 74, and a printer 246. The CoupAd host system performs processing as previously described herein. Also included is a secure manufacturer interface 247 for manufacturers to access the Coupad Central Server as previously described.

Figure 15:
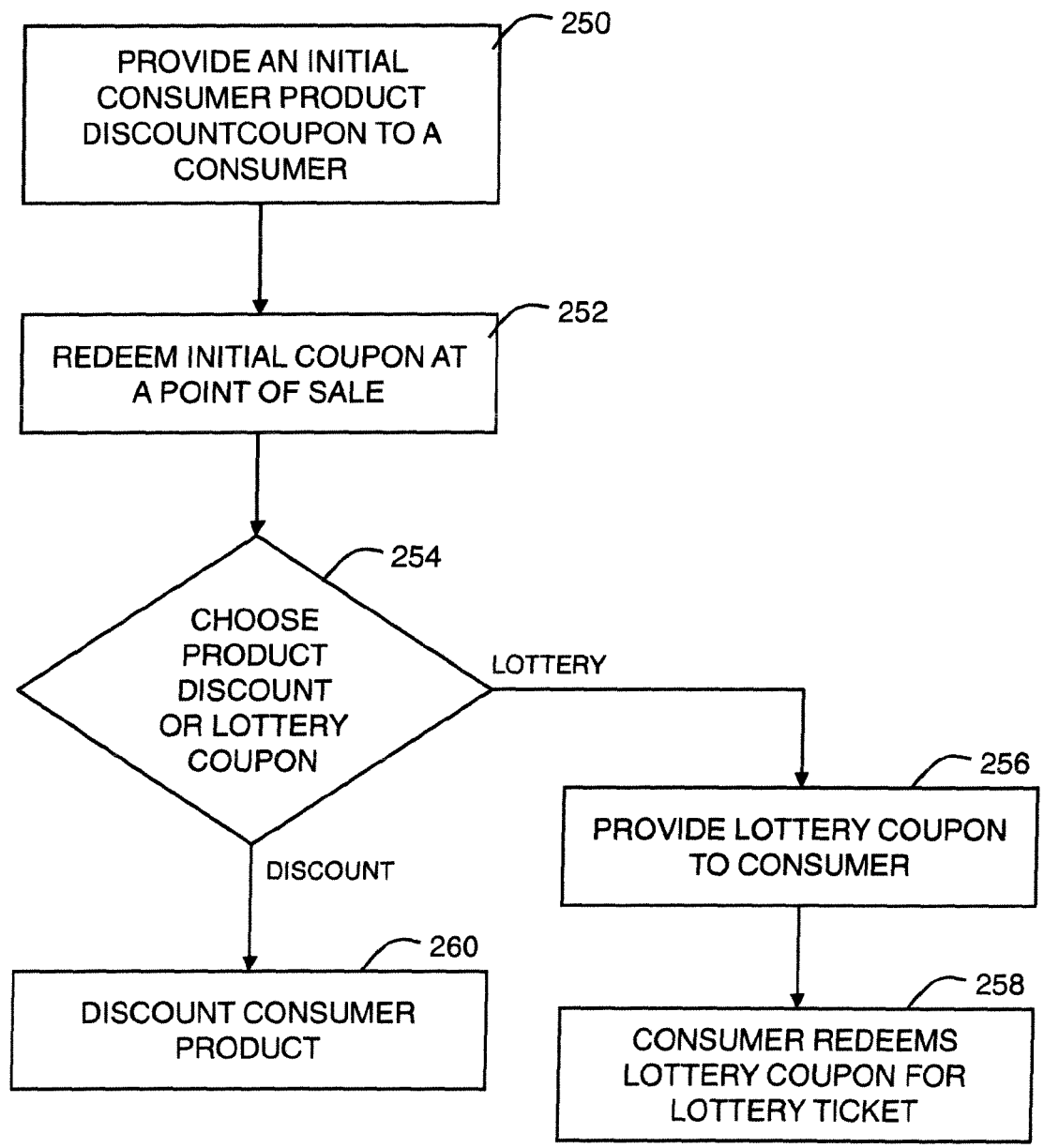
FIG. 15 is a flow chart of a method of providing a lottery coupon according to concepts of the present application.

With reference now to FIG. 15, a flowchart is shown illustrating the overall concept of the present application with regard to the previously described Coupad coupon 30. An initial discount coupon such as, e.g., the Coupad coupon 30, is provided to a consumer at step 250. The discount coupon is redeemed at a retailer POS terminal at step 252. Upon successful verification of the discount coupon by the CoupAd server 80, the consumer is offered a choice between a product discount as specified on the discount coupon or a lottery coupon in lieu of the product discount at step 254. Upon acceptance of the Lottery coupon option, and verification of legal age as previously described, a lottery coupon is provided to the consumer at step 256. The consumer subsequently, at his or her discretion, redeems the lottery coupon at an authorized lottery station and receives a lottery ticket in exchange for the lottery coupon at step 258. The redemption and choice are processed according to concepts as previously described with reference to FIG. 5. If the Lottery option is not accepted, or the consumer is not of legal age, the product discount is provided to the consumer at step 260.

Figure 16:
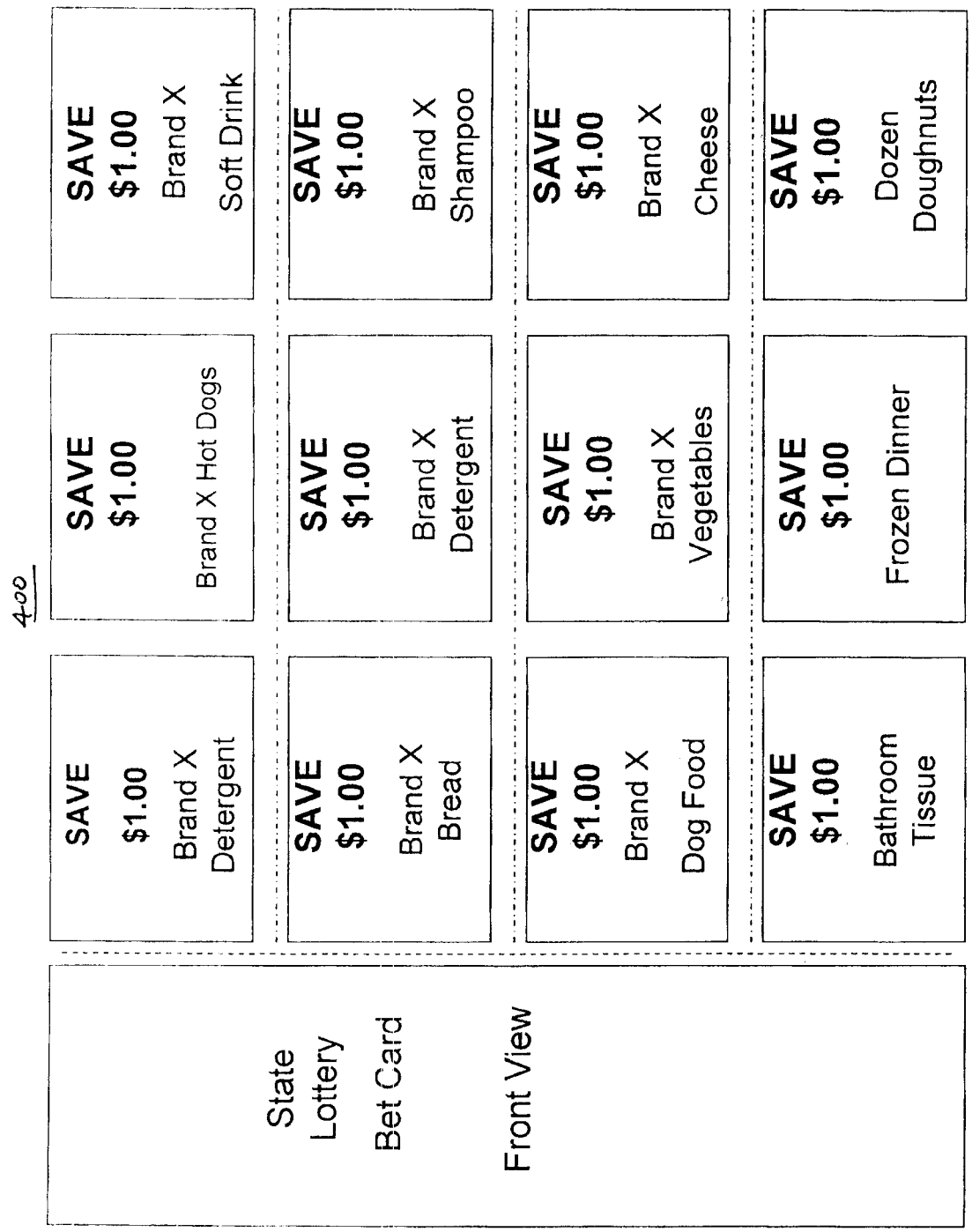
FIGS. 16 and 17 are exemplary bet slips including coupons.
Figure 17:
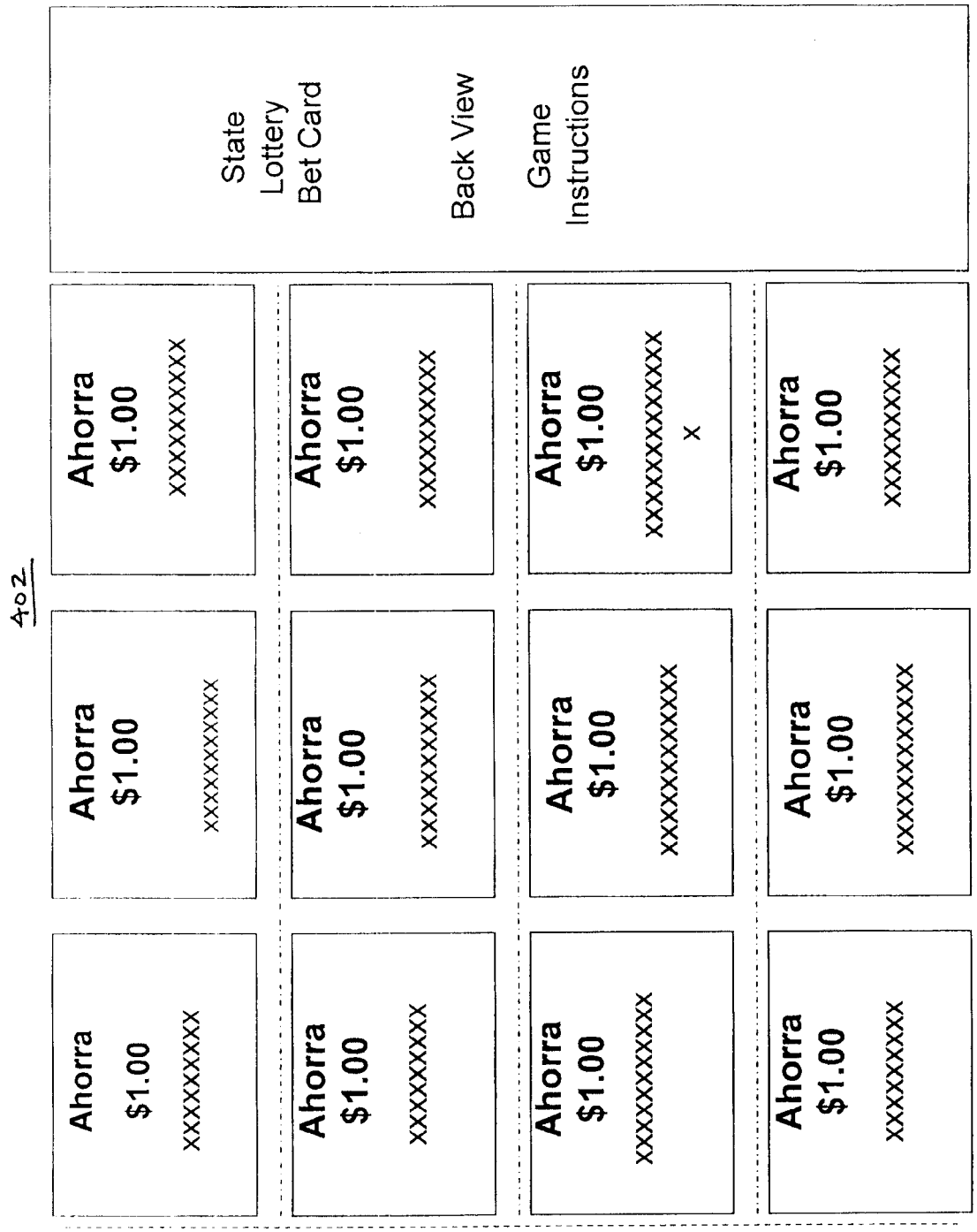

With reference to FIG. 16, an exemplary Lottery FreePlay Coupon sheet 400 is shown. Further, With reference to FIG. 17, an exemplary Spanish-language Lottery FreePlay Coupon sheet 402 is shown. It is to be appreciated that the coupons and associated instructions described herein may be multi-lingual or may be directed to any language. The scope of the present application is not limited with respect to written and/or spoken language.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for point of sale consumer packaged goods and lottery promotions, the method comprising:
   providing a first coupon to a consumer, the first coupon including a first ID and a second ID, the first ID encoding a first set of data including a manufacturer ID, at least one of a retail product and a retail product family, and a discount value code, and the second ID encoding a second set of data including a FreePlay identifier code;
   scanning the first ID and the second ID by a POS system when presented for redemption by a consumer;
   recognizing the FreePlay identifier code by the POS system; and
   based on recognizing the FreePlay identifier code performing a Lottery FreePlay method, the Lottery FreePlay method comprising:
      offering the consumer a second coupon in exchange for the first coupon; and
      based on receiving a response indicating acceptance of the second coupon, providing the second coupon to the consumer in exchange for the first coupon;
   wherein the first coupon comprises a discount coupon and the second coupon comprises a Lottery FreePlay coupon, and wherein providing the second coupon includes: (i) Printing the second coupon separate from a receipt generated by the POS system or (ii) printing the second coupon on the receipt generated by the POS system, and further wherein the second coupon is provided to the consumer in lieu of giving the consumer a discount on the retail product, the Lottery FreePlay coupon redeemable at an authorized lottery booth for a lottery ticket having a purchase price based on the discount value code.

2. The method set forth in claim 1, wherein the first ID comprises a first barcode and the second ID comprises a second barcode including an expiration date and an application ID string.

3. The method set forth in claim 1, the method further comprising:
   connecting a CoupAd server to the POS system by means of a hardware interface of the POS system, wherein the step of recognizing the FreePlay identifier code and the step of performing the Lottery FreePlay method are performed by the CoupAd server, and wherein no modifications are made to the POS system.

4. The method set forth in claim 3, the method further comprising:
   receiving coupon data by the CoupAd server from a CoupAd Central Server, the coupon data including coupon verification data.

5. The method set forth in claim 4, the method further comprising:
   periodically receiving maintenance to the coupon data, the maintenance including additions, deletions and changes to the coupon data.

6. The method set forth in claim 4, the Lottery FreePlay method further comprising:
   verifying the discount coupon by the CoupAd server based on the received coupon data.

7. A system for point of sale consumer packaged goods and lottery promotions comprising:
   a POS system, the POS system including:
      a POS user interface for receiving instructions from a user and for displaying information to the user;
      a POS scanner configured to scan retail product IDs;
      a POS processor for controlling operation of the POS system, the POS user interface, and the POS scanner; and
      a POS hardware interface including:
         a POS processor connection point;
         a POS scanner connection point; and
         a POS user interface connection point;
   a CoupAd server operatively connected to the POS system by means of the POS hardware interface, the CoupAd server including:
      a CoupAd user interface for receiving instructions from the user and for displaying information to the user;
      a CoupAd storage device for storing coupon data received by the CoupAd server from a CoupAd Central Server; and a CoupAd processor for controlling operation of the CoupAd server, the CoupAd user interface, and the CoupAd storage device, wherein the CoupAd server is configured to perform a FreePlay recognition process comprising:

receiving from the POS scanner by means of the POS scanner connection point, scanned coupon ID data from a first coupon received from a consumer, the coupon ID data including at least one of a retail product and a retail product family, a discount value code, and a FreePlay identifier code; and recognizing the FreePlay identifier code by the CoupAd server and, based on recognizing the FreePlay identifier code performing a Lottery FreePlay offer process comprising:

offering by means of at least one of the POS system user interface and the CoupAd server user interface, a choice of a second coupon in exchange for the first coupon; and based on receiving a response indicating acceptance of the second coupon, providing the second coupon to the consumer in exchange for the first coupon;

wherein the first coupon comprises a discount coupon and the second coupon is provided to the consumer in lieu of giving the consumer a discount on the retail product, and wherein the second coupon comprises a Lottery FreePlay coupon redeemable at an authorized lottery booth for a lottery ticket having a purchase price based on the discount value code.

8. The system set forth in claim 7, the CoupAd server further comprising:

a CoupAd printer, wherein the second coupon is printed on the CoupAd printer.

9. The system set forth in claim 7, the POS system further comprising:

a POS printer; and the POS hardware interface further including a POS printer connection point, wherein the second coupon is printed on the POS printer by means of the POS printer connection point.

10. The system set forth in claim 7, wherein the coupon ID data includes a first ID and a second ID, the first ID encoding a first set of ID data including a manufacturer ID, at least one of a retail product and a retail product family, and a discount value code, and the second ID encoding a second set of ID data including the FreePlay identifier code.

11. The system set forth in claim 10, wherein the first ID comprises a first barcode and the second ID comprises a second barcode, and wherein the second ID includes an expiration date and an application ID string.

12. The system set forth in claim 7, wherein the CoupAd server is further configured to request proof of legal age based on the receiving a response indicating acceptance of the second coupon, and only providing the second coupon based on receiving the proof of legal age.

13. The system set forth in claim 12, further comprising a CoupAd Central Server, the CoupAd Central Server comprising:

a CoupAd host user interface for receiving instructions from an authorized user and for displaying information to the authorized user;

a CoupAd database for storing coupon data describing coupon offers, the coupon offers including the Lottery FreePlay coupon; and a CoupAd host processor for controlling operation of the CoupAd Central Server and the CoupAd host user interface; wherein the CoupAd server is further configured to receive coupon data from the CoupAd Central Server, the coupon data including coupon verification data.

14. The system set forth in claim 13, wherein the CoupAd server is further configured to periodically receive maintenance to the coupon data, the maintenance including additions, deletions and changes to the coupon data.

15. The system set forth in claim 13, wherein the CoupAd server is further configured to verify the discount coupon based on the received coupon data.

16. The system set forth in claim 13, wherein the CoupAd database includes:

a retail stores table describing participating retailers;

a CoupAd coupon table including the coupon data describing coupon offers;

a Lottery FreePlay coupon table including lottery commission coordination data;

a CoupAd server table including CoupAd server IP addresses, retailer store numbers, register numbers, and printer numbers;

a state lottery table including at least one State lottery commission ID;

a Lottery Outlet table including at least one outlet State Lottery commission ID;

a clearinghouse table including at least one clearinghouse ID;

a manufacturer's agent table including at least one agent number and agent name;

a manufacturer's company prefix table including at least one manufacturer's company prefix; and a general ledger table containing including general ledger account numbers.

\* \* \* \* \*